United States Patent
Gervasio et al.

(10) Patent No.: US 10,297,087 B2
(45) Date of Patent: May 21, 2019

(54) METHODS AND SYSTEMS FOR GENERATING A MERGED REALITY SCENE BASED ON A VIRTUAL OBJECT AND ON A REAL-WORLD OBJECT REPRESENTED FROM DIFFERENT VANTAGE POINTS IN DIFFERENT VIDEO DATA STREAMS

(71) Applicant: Verizon Patent and Licensing Inc., Arlington, VA (US)

(72) Inventors: William Patrick Gervasio, Liberty Corner, NJ (US); Oliver S. Castaneda, Warren, NJ (US); Denny Breitenfeld, Florham Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 17 days.

(21) Appl. No.: 15/610,573

(22) Filed: May 31, 2017

(65) Prior Publication Data

US 2018/0350146 A1 Dec. 6, 2018

(51) Int. Cl.
| | |
|---|---|
| *G06T 15/20* | (2011.01) |
| *G06T 17/00* | (2006.01) |
| *H04N 21/81* | (2011.01) |
| *H04N 5/247* | (2006.01) |
| *H04N 21/218* | (2011.01) |
| *H04N 21/6587* | (2011.01) |
| *G06T 19/00* | (2011.01) |
| *H04N 13/178* | (2018.01) |

(Continued)

(52) U.S. Cl.
CPC ............ *G06T 19/006* (2013.01); *G01B 11/24* (2013.01); *G06T 15/205* (2013.01); *G06T 17/00* (2013.01); *H04N 5/247* (2013.01); *H04N 21/21805* (2013.01); *H04N 21/6587* (2013.01); *H04N 21/816* (2013.01); *H04N 21/8146* (2013.01)

(58) Field of Classification Search
CPC .................................................... G06T 19/006
See application file for complete search history.

(56) References Cited

U.S. PATENT DOCUMENTS

| | | | | |
|---|---|---|---|---|
| 6,707,487 B1 * | 3/2004 | Aman | ................ | A63B 24/0003 348/169 |
| 2009/0315978 A1 * | 12/2009 | Wurmlin | ................ | G06T 5/005 348/43 |

(Continued)

FOREIGN PATENT DOCUMENTS

EP 2384001 11/2011

*Primary Examiner* — Daniel F Hajnik

(57) ABSTRACT

An exemplary merged reality scene capture system ("system") receives a first frame set of surface data frames from a plurality of three-dimensional ("3D") capture devices disposed with respect to a real-world scene so as to have a plurality of different vantage points of the real-world scene. Based on the first frame set, the system generates a transport stream that includes color and depth video data streams for each of the 3D capture devices. Based on the transport stream, the system generates entity description data representative of a plurality of entities included within a 3D space of a merged reality scene. The plurality of entities includes a virtual object, the real-world object, and virtual viewpoints into the 3D space from which a second frame set of surface data frames are to be rendered representing color and depth data for both the virtual and the real-world objects.

20 Claims, 16 Drawing Sheets

(51) Int. Cl.
*H04N 13/194* (2018.01)
*G01B 11/24* (2006.01)

(56) References Cited

U.S. PATENT DOCUMENTS

| | | | |
|---|---|---|---|
| 2012/0050256 A1* | 3/2012 | Thiel | G06T 19/003 |
| | | | 345/419 |
| 2012/0139906 A1 | 6/2012 | Zhang et al. | |
| 2015/0294492 A1* | 10/2015 | Koch | H04N 13/243 |
| | | | 345/426 |
| 2016/0093078 A1 | 3/2016 | Davis et al. | |
| 2017/0148339 A1 | 5/2017 | Van Curen et al. | |

* cited by examiner

METHODS AND SYSTEMS FOR GENERATING A MERGED REALITY SCENE BASED ON A VIRTUAL OBJECT AND ON A REAL-WORLD OBJECT REPRESENTED FROM DIFFERENT VANTAGE POINTS IN DIFFERENT VIDEO DATA STREAMS

BACKGROUND INFORMATION

People may experience virtual three-dimensional ("3D") spaces (e.g., based on virtual scenes including virtual objects, real-world scenes including real-world objects, merged reality scenes including both virtual and real-world objects, etc.) for various reasons and in connection with various types of applications. For example, users of media player devices configured to present representations of virtual 3D spaces may experience virtual 3D spaces for entertainment purposes, educational purposes, long-distance communication purposes, vicarious experience/travel purposes, or in connection with various other purposes and/or applications.

Virtual reality is one example of an application where users experience virtual 3D spaces. Virtual reality media content may be used to immerse users (i.e., viewers of the virtual reality media content) into interactive virtual reality worlds that users may experience by directing their attention to any of a variety of things being presented in the immersive virtual reality world at the same time. For example, at any time during the presentation of the virtual reality media content, a user experiencing the virtual reality media content may look around the immersive virtual reality world in any direction, giving the user a sense that he or she is actually present in and experiencing the immersive virtual reality world from a particular location and perspective (e.g., angle, viewpoint, etc.) within the immersive virtual reality world.

In some examples, immersive virtual reality worlds may include both virtual elements and real-world elements. Such virtual 3D spaces may be referred to as merged reality scenes, and may provide various benefits to users such as, for example, allowing users to experience real-world elements (e.g., elements associated with a live event) augmented by virtual elements not present in the real world.

To provide users with maximum flexibility to experience merged reality scenes, conventional media player devices have typically received data representative of the merged reality scene (e.g., 3D models of virtual and real-world objects) prior to the time when the user experiences the merged reality scene. Unfortunately, a requirement to preload, rather than to stream, data may preclude or place significant limitations on certain types of experiences that may be provided to the user. For example, it would not be possible for data representative of live events that a user may wish to experience in real-time (e.g., live real-world sporting events, shared virtual reality events, etc.) to be received and preloaded prior to when the events begin.

Moreover, media player devices and/or other system components streaming the data may be tasked with processing burdens that cannot scale to present larger or more detailed merged reality scenes. For example, a significant amount of additional data (e.g., approximately twice as much data) may be needed to represent 3D models for a merged reality scene with, for example, ten objects, as compared to a merged reality scene with, for example, five objects. Thus, even if a provider system is capable of streaming 3D models for five objects to a media player device in real time, the provider system may be incapable of scaling up to streaming 3D models for ten objects, one hundred objects, or more, especially when real-world objects and virtual objects within the merged reality scene are interacting together.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
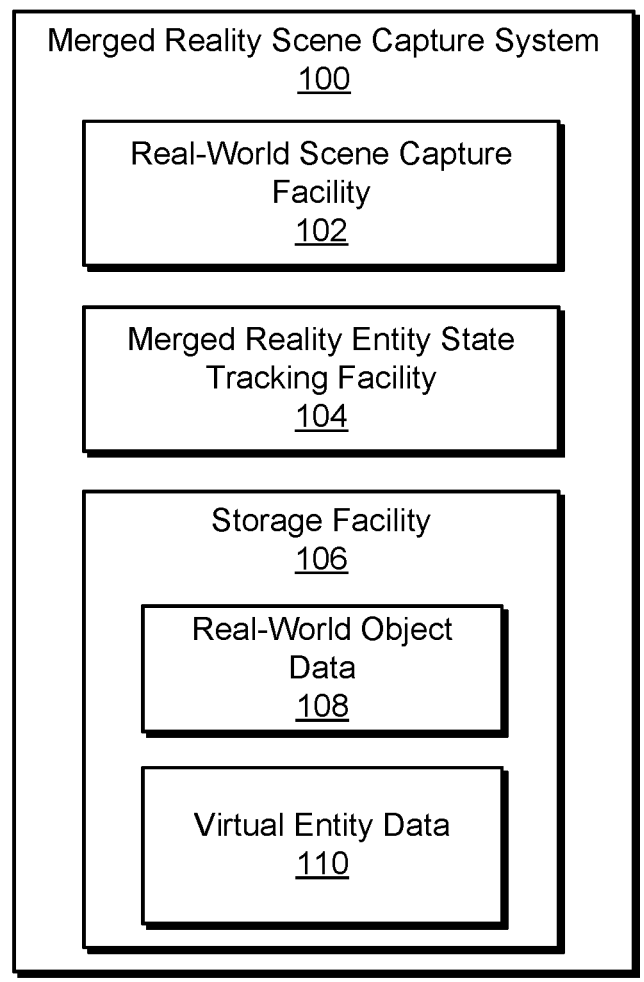
FIG. 1 illustrates an exemplary merged reality scene capture system for generating a merged reality scene based on a virtual object and on a real-world object represented from different vantage points in different video data streams according to principles described herein.

Methods and systems for generating a merged reality scene based on a virtual object and on a real-world object represented from different vantage points in different video data streams are described herein. For example, as will be described in more detail below, a merged reality scene capture system may receive a first frame set including a first plurality of surface data frames from a plurality of three-dimensional ("3D") capture devices disposed with respect to a real-world scene so as to have a plurality of different vantage points of the real-world scene. Each of the surface data frames in the first plurality of surface data frames may be captured at a same particular point in time by a respective 3D capture device in the plurality of 3D capture devices. Moreover, each of the surface data frames may be captured from a different respective vantage point in the plurality of different vantage points. Accordingly, each of the surface data frames may be representative of color data and depth data of surfaces of one or more real-world objects included within the real-world scene as the surfaces appear from the respective vantage point of the respective 3D capture device at the particular point in time.

Based on the first frame set received from the plurality of 3D capture devices, as well as based on a plurality of other frame sets captured at other points in time (e.g., previous and/or subsequent points in a continuous sequence of time), the merged reality scene capture system may generate a transport stream. For example, the transport stream may include a color video data stream and a depth video data stream for each of the 3D capture devices in the plurality of 3D capture devices (e.g., representing color and depth video data, respectively, visible from each of the vantage points of the 3D capture devices throughout the continuous sequence of time).

Based on the transport stream, the merged reality scene capture system may generate (e.g., create, update, etc.) entity description data representative of a plurality of entities included within a 3D space of a merged reality scene. For example, the plurality of entities may include a virtual object that is at least partially defined in the entity description data by links to color data and depth data of surfaces of the virtual object that are stored within an asset storage system communicatively coupled to the merged reality scene capture system. The plurality of entities may further include a real-world object, which may, in turn, be at least partially defined in the entity description data by links to color data and the depth data of the surfaces of the real-world object included within the color video data stream and the depth video data stream (i.e., the video data streams generated based on the first frame set received from the plurality of 3D capture devices and based on the plurality of other frame sets). Additionally, the plurality of entities may include a plurality of virtual viewpoints into the 3D space from which a second frame set including a second plurality of surface data frames are to be rendered. For example, the second plurality of surface data frames included within the second frame set may be rendered by a plurality of server-side 3D rendering engines communicatively coupled to the merged reality scene capture system to be representative of the color data and the depth data of the surfaces of both the virtual and the real-world objects included within the 3D space of the merged reality scene.

Systems and methods for generating a merged reality scene based on a virtual object and on a real-world object represented from different vantage points in different video data streams described herein may provide various advantages and benefits. As one example, systems and methods described herein may facilitate users of media player devices configured to present representations of virtual 3D spaces in experiencing the virtual 3D spaces using the media player devices. As used herein, a "3D space" may refer to a 3D representation (e.g., a wholly virtualized representation or a representation based at least in part on a reproduction of real-world elements) of an environment or a world that may be experienced by a user in a similar way as the user might experience the real world. For example, a user experiencing a virtual or merged reality scene may be able to move about within the 3D space and look at and/or otherwise interact with objects included within the 3D space. In some examples, a 3D space may be wholly virtualized (e.g., computer generated) and represented in a similar way as a real-world scene may be represented. In other examples, a 3D space may be based, at least in part, on one or more real-world objects captured from a real-world scene.

In any case, systems and methods described herein may facilitate the streaming of 3D spaces of merged reality scenes (i.e., virtual 3D spaces of scenes that include both real-world objects and virtual objects), in their entirety, from a provider system such that data representative of the 3D spaces and the virtual and real-world objects included therein do not need to be preloaded or stored on a media player device prior to the experiencing of the 3D space by the user of the media player device. All the data needed for a media player device to present the merged reality scene may be streamed to the media player device so that data representative of merged reality scene content does not need to be downloaded, stored, or otherwise accessed (e.g., by way of a local physical storage) prior to the presentation of the merged reality scene to the user. In some examples, this streaming capability may allow merged reality scenes associated with time-sensitive content (e.g., real-world or virtual events occurring in real time) to be experienced by the user in real time as events in the merged reality scenes occur.

Moreover, systems and methods for generating a merged reality scene based on a virtual object and on a real-world object represented from different vantage points in different video data streams described herein may facilitate providing virtual reality media content representative of the merged reality scene to media player devices in such a way that the virtual reality media content may be rendered from arbitrary virtual locations and dynamically selectable virtual viewpoints within the 3D space. Specifically, as will be described in more detail below, by rendering frames of a merged reality scene from different virtual viewpoints, a merged reality scene capture system and/or other server-side systems associated with the merged reality scene capture system may include the frames in a data pipeline configured to allow a media player device to render, in three dimensions, the 3D space of the merged reality scene from arbitrary and dynamically selectable virtual viewpoints based on a plurality of two-dimensional ("2D") video streams. For example, 2D video data streams such as the color video data streams and depth video data streams described herein may be included in the data pipeline (e.g., packaged up in one or more transport streams). However, while the 2D video data streams may be associated with relatively fixed viewpoints (e.g., the plurality of virtual viewpoints included in the plurality of entities represented in the entity description data generated and maintained by the merged reality scene capture system), the media player device may allow a user of the media player device to experience the 3D space of the merged reality scene in three dimensions and from arbitrary virtual viewpoints (e.g., non-fixed viewpoints that are not aligned with or otherwise related to the relatively fixed viewpoints with which the 2D video data streams are associated).

As a result, the media player device may render the 3D space from the arbitrary virtual viewpoints without having to stream 3D model data representative of a variable and potentially unlimited number of 3D models associated with the 3D space. For example, rather than providing data representative of 3D models of every object included within the virtual 3D space, the data pipeline may provide 2D video data (e.g., color video data streams and depth video data streams) representative of all the real-world and virtual objects within the 3D space from a few virtual viewpoints. As such, an unlimited number of objects may be represented in a rendering of the merged reality scene without the media player device having to receive additional data or additional amounts of data or perform additional rendering work than would be required for rendering the merged reality scene with only one or two objects, for example.

Additionally, by generating, maintaining, and providing all the data representative of the merged reality scene to the media player devices without relying on preloaded content already stored at the media player devices, the system and methods described herein may allow 3D spaces to be generated or modified (e.g., in real time or near real time as events occur in a real-world scene) by the provider without having to modify preloaded data stored on the media player device. As a result, content creators responsible for generating a merged reality scene or one or more users experiencing the merged reality scene may provide commands to the merged reality scene capture system to modify aspects of the merged reality scene (e.g., to modify, replace, or remove entities such as virtual or real-world objects, etc.), and these modifications can be instantly reflected in the data being streamed to users such that the merged reality scene is modified in real time or near real time.

Similarly, various operations that may be computationally expensive (e.g., prohibitively expensive for certain media player devices) may be performed by powerful computing resources associated with the merged reality scene capture system, which may be operated by a virtual reality media provider and may be associated with much more powerful computing resources (e.g., large servers or the like) than, for example, the media player devices associated with users. For example, the merged reality scene capture system may perform computationally expensive operations to integrate virtual objects with real-world objects in the merged reality scene, to perform physics operations with respect to objects within a merged reality scene, to perform artificial intelligence operations with respect to the objects, and so forth. Because these operations are performed at the server-side rather than the client-side, the media player devices operated by users may not need to be associated with particularly powerful computing resources, thereby conserving user device resources, minimizing transmission bandwidth, providing convenience to users (e.g., in terms of portability, cooling, etc.), and enabling various types of media player devices (e.g., with various form factors, various price points, etc.) to provide the experience of the merged reality scene to users as long as the users have a client-side media player.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary merged reality scene capture system 100 ("system 100") for generating a merged reality scene based on at least a virtual object and a real-world object represented from different vantage points in different video data streams. As shown, system 100 may include, without limitation, a real-world scene capture facility 102, merged reality entity state tracking facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. In some examples, each of facilities 102 through 106 may be distributed between multiple devices and/or multiple locations as may serve a particular implementation. Each of facilities 102 through 106 will now be described in more detail with reference to certain other figures included herein.

Real-world scene capture facility 102 may include one or more physical computing devices (e.g., hardware and/or software components such as processors, memories, communication interfaces, instructions stored in memory for execution by the processors, etc.) that perform various operations associated with capturing and acquiring data to be used for generating a merged reality scene based on a virtual object and on a real-world object represented from different vantage points in different video data streams. Specifically, for example, real-world scene capture facility 102 may receive a first frame set including a first plurality of surface data frames from a plurality of three-dimensional (3D) capture devices disposed with respect to a real-world scene so as to have a plurality of different vantage points of the real-world scene.

Each of the surface data frames in the first plurality of surface data frames may be captured at a same particular point in time as the other surface data frames in the first plurality of surface data frames, and may be captured by a respective 3D capture device in the plurality of 3D capture devices from a respective vantage point in the plurality of different vantage points. As used herein, surface data frames may be said to be captured "at a same particular point in time" when the surface data frames are captured close enough in time so as to effectively represent a subject (e.g., a real-world object within a real-world scene) at a moment in time (i.e., as opposed to representing the subject over a range of time), even if the surface data frames are not captured at precisely the same instant. For instance, depending on how dynamic a particular subject is (e.g., how fast one or more real-world objects move through a real-world scene or the like), surface data frames may be considered to be captured at the same particular point in time when captured within, for example, several tens or hundreds of milliseconds of one another, or when captured within another suitable timeframe (e.g., within microseconds, milliseconds, seconds, etc.) as may serve a particular implementation. As such, each of the surface data frames may be representative of color data and depth data of surfaces of a real-world object included within the real-world scene as the surfaces appear from the respective vantage point of the respective 3D capture device at the particular point in time.

Figure 2:
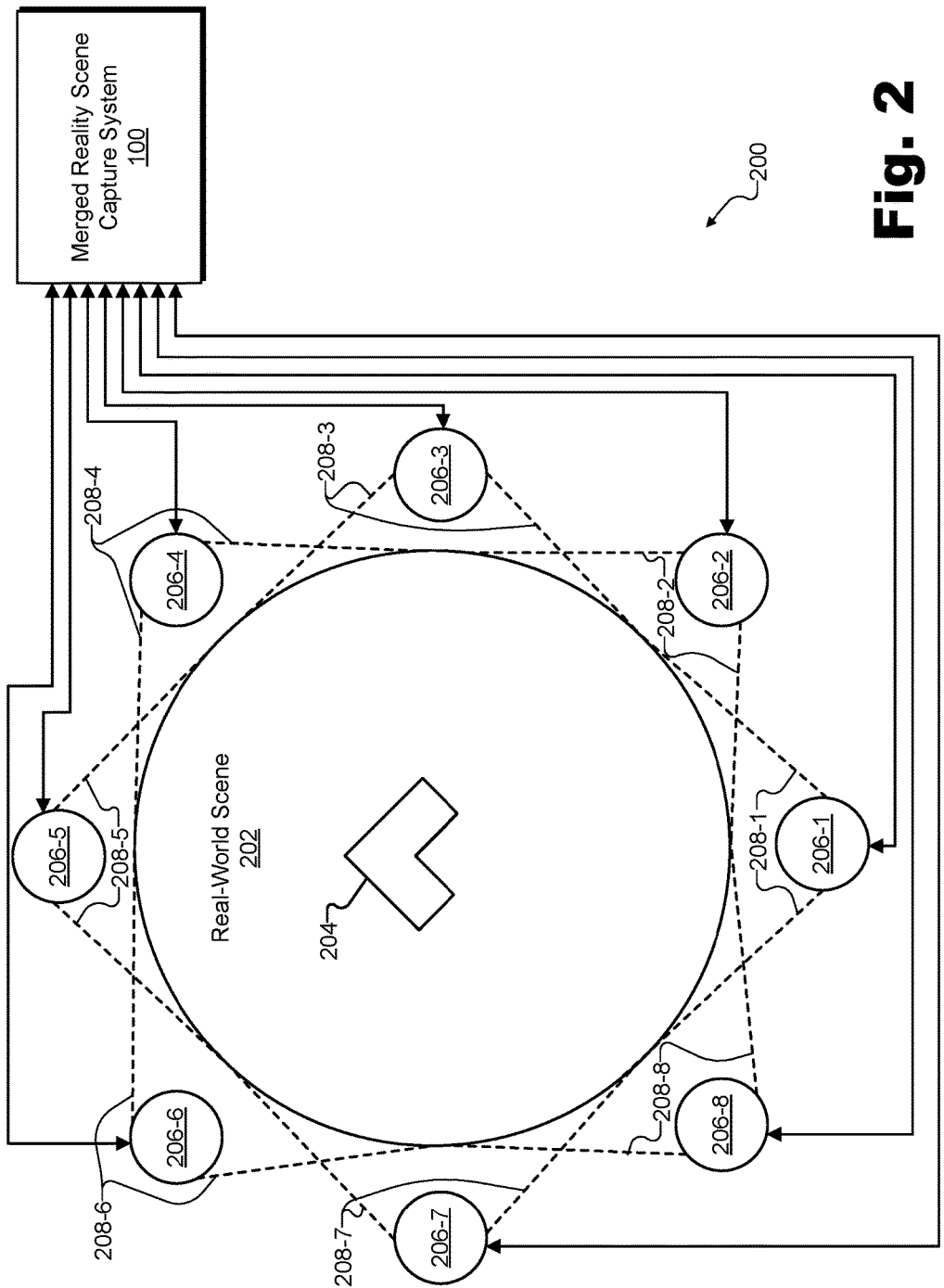
FIG. 2 illustrates an exemplary configuration in which the merged reality scene capture system of FIG. 1 interoperates with a plurality of three-dimensional ("3D") capture devices to capture data representative of an exemplary real-world scene that includes an exemplary real-world object according to principles described herein.

To illustrate, FIG. 2 shows an exemplary configuration 200 in which system 100 (e.g., real-world scene capture facility 102) interoperates with a plurality of 3D capture devices to capture data representative of an exemplary real-world scene that includes an exemplary real-world object. Specifically, as shown in FIG. 2, configuration 200 includes a real-world scene 202 that includes a real-world object 204 and is surrounded by a plurality of 3D capture devices 206 (e.g., 3D capture devices 206-1 through 206-8) each associated with a respective vantage point 208 (e.g., vantage point 208-1 associated with 3D capture device 206-1 through vantage point 208-8 associated with 3D capture device 206-8). 3D capture devices 206 may be communicatively coupled with system 100 (e.g., with real-world scene capture facility 102 within system 100 as described above), which may receive respective frame sets from 3D capture devices 206 that each include a respective plurality of surface data frames.

As used herein, a "surface data frame" may refer to a dataset that represents various types of data associated with surfaces of objects (e.g., real-world objects, virtual objects, etc.) visible within a 3D space from a particular vantage point or virtual viewpoint at a particular point in time or point in another temporal sequence associated with the 3D space. For example, a surface data frame may include color data (i.e., image data) as well as depth data representative of the objects as viewed from a particular vantage point with respect to the 3D space. As such, a plurality of related surface data frames may be sequenced together to create a video-like representation (representing not only color but also depth data) of a scene (e.g., a virtual scene, a real-world scene, a merged reality scene, etc.) as the scene would be viewed or experienced from the particular vantage point. In certain examples, a surface data frame may further be associated with other types of data such as audio data, metadata (e.g., metadata including information about specific objects represented in the surface data frame and/or information about vantage points associated with the scene), and/or other types of data as may serve a particular implementation. Examples of surface data frames associated with different vantage points, as well as sequences of related surface data frames will be described and illustrated below.

As used herein, "color data" may broadly include any image data, video data, or the like, whether represented in color or grayscale (i.e., "black and white"), that represents how a subject (e.g., a real-world or virtual object included within a 3D space of a virtual, real-world, or merged reality scene) may appear at a particular point in time or over a particular time period from the perspective of a particular vantage point. Color data is not limited to any particular format, file type, frame rate, resolution, quality level, or other characteristic that may be associated with various definitions and/or standards defining image data and/or video data in the art. Similarly, as used herein, "depth data" may include any data representative of a position of a subject in space. For example, depth data representative of a real-world or virtual object may include coordinates with respect to a global coordinate system (e.g., a global coordinate system associated with the 3D space of the real-world, virtual, or mixed reality scene associated with the 3D space) for different points on the surfaces of the virtual object.

Each of the elements of configuration 200 will now be described in detail.

Real-world scene 202 may represent any real-world scenery, real-world location, real-world event (e.g., live event, etc.), or other subject existing in the real world (e.g., as opposed to existing only in a virtual world or an imaginary world) as may serve a particular implementation. As illustrated by the circle representing real-world scene 202 in FIG. 2, real-world scene 202 may be a specifically delineated area such as a stage, an arena, or the like. Conversely, in other examples, real-world scene 202 may not be so well defined or delineated. For example, real-world scene 202 may include any indoor or outdoor real-world location such as a city street, a museum, a scenic landscape, or the like. In certain examples, real-world scene 202 may be associated with a real-world event such as a sporting event, a musical event, a dramatic or theatrical presentation, a large-scale celebration (e.g., New Year's Eve on Times Square, Mardis Gras, etc.), a political event, or any other real-world event. In the same or other examples, real-world scene 202 may be associated with a setting for a fictionalized scene (e.g., a set of a live-action virtual reality television show or movie) and/or any other scene at any other indoor or outdoor real-world location as may serve a particular implementation.

Accordingly, real-world object 204 may represent any real-world object, whether living or inanimate, that is associated with real-world scene 202 (e.g., located within or around real-world scene 202) and that is detectable (e.g., viewable, etc.) from at least one of vantage points 208. For example, while real-world object 204 is drawn as a relatively simple geometric shape for the sake of clarity, it will be understood that real-world object 204 may represent various types of objects having various levels of complexity. Rather than a geometric shape, for instance, real-world object 204 could represent any animate or inanimate object or surface, such as a person or another living thing, a non-transparent solid, liquid, or gas, a less discrete object such as a wall, a ceiling, a floor, or any other type of object described herein or as may serve a particular implementation.

As shown, real-world object 204 may include various surfaces that may each reflect light (e.g., ambient light in real-world scene 202, infrared light in a structured light pattern emitted by a depth capture device, etc.) to be detected by 3D capture devices 206. While real-world object 204 is depicted to be relatively simple, the depth of the surfaces of real-world object 204 may appear different based on which position 206 and vantage point 208 the surfaces are detected from, as will be illustrated below. In other words, real-world object 204 may look different based on a perspective (e.g., position, vantage point, etc.) from which real-world object 204 is viewed.

3D capture devices 206 may each be fixed with respect to real-world scene 202. For example, both real-world scene 202 and 3D capture devices 206 may be stationary, or real-world scene 202 and 3D capture devices 206 may be in motion together. In some examples, such as shown in configuration 200, 3D capture devices 206 may surround real-world scene 202 along at least two dimensions associated with real-world scene 202 (e.g., along a plane such as the ground). In certain examples, 3D capture devices 206 may surround real-world scene 202 along three dimensions (e.g., by including 3D capture devices 206 above and below real-world scene 202 as well). Examples of 3D capture devices will be described in more detail below.

Vantage points 208 may be illustrated with respect to each 3D capture device 206 by dotted lines emanating from the 3D capture device 206. In some examples, as shown in configuration 200, vantage points 208 may each be angled inwardly toward real-world scene 202 so as to capture real-world scene 202 from enough perspectives to be able to later render real-world scene 202 from an arbitrary virtual viewpoint. Additionally, in the same or other examples, one or more of vantage points 208 may be angled outwardly (i.e., away from real-world scene 202) to capture objects surrounding real-world scene 202 or the like. For instance, a 360-degree capture device with a spherical, outward facing vantage point may be placed at a position in the middle of real-world scene 202 (not explicitly shown) to capture objects included within real-world scene 202 from additional perspectives and/or to capture devices outside of real-world scene 202. Additionally or alternatively, in certain examples, a plurality of outward facing vantage points may allow for capture of a panoramic, wide angle, or 360-degree view of a real-world scene.

In certain examples, system 100 (e.g., real-world scene capture facility 102) may be communicatively coupled to 3D capture devices 206 by way of one or more networks and/or any other suitable communication interfaces, protocols, and technologies. Accordingly, in these examples, real-world scene capture facility 102 may receive the first frame set including the first plurality of surface data frames (as well as other frame sets including other pluralities of surface data frames as will be described below) from 3D capture devices 206 by way of the one or more networks and/or other communication interfaces, protocols, and technologies. For example, as shown, various arrows in configuration 200 represent communications between 3D capture devices 206 and system 100. These communications may be implemented by way of a network (e.g., a wired or wireless local area network, a wide area network, a provider network, the Internet, etc.), by way of a wired communication interface (e.g., Universal Serial Bus ("USB")), by way of a wireless communication interface, or by way of any other communication interface, protocol, and/or technology as may serve a particular implementation.

In other examples, the plurality of 3D capture devices may be integrated within or otherwise included as part of system 100 (e.g., as part of real-world scene capture facility 102). As such, in these examples, real-world scene capture facility 102 may receive the first frame set (as well as the other frame sets) by capturing the first frame set using the integrated 3D capture devices 206.

Figure 3A:
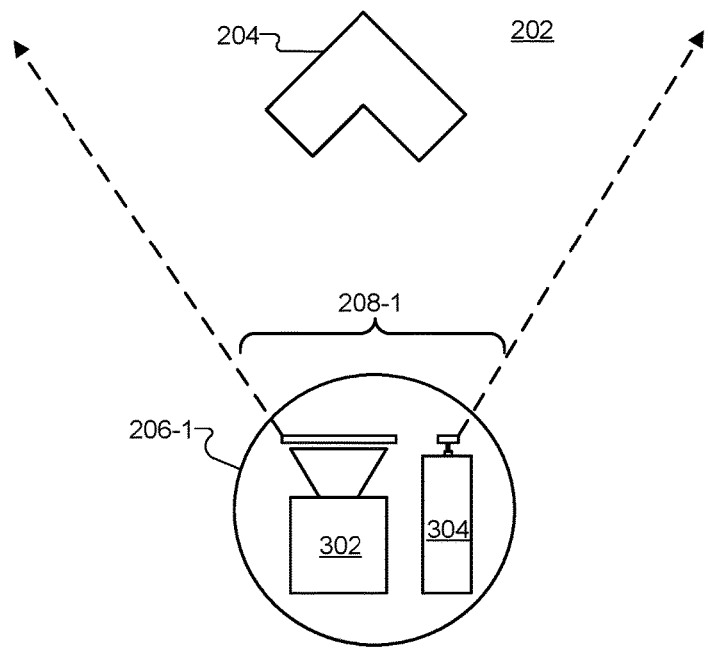
FIG. 3A shows an exemplary 3D capture device capturing a surface data frame representative of the real-world object of FIG. 2 according to principles described herein.
Figure 3B:
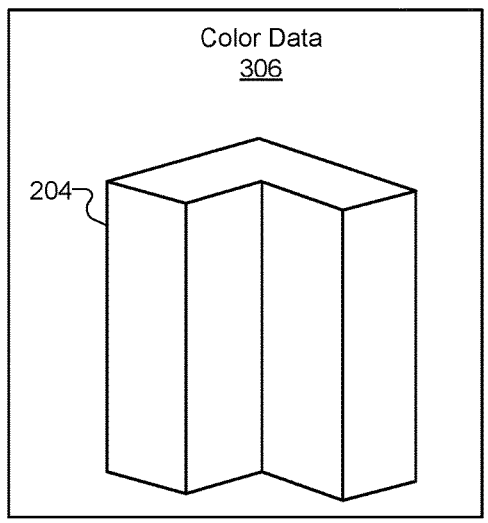
FIG. 3B illustrates an exemplary graphical depiction of color data represented in the surface data frame captured by the 3D capture device of FIG. 3A according to principles described herein.
Figure 3C:
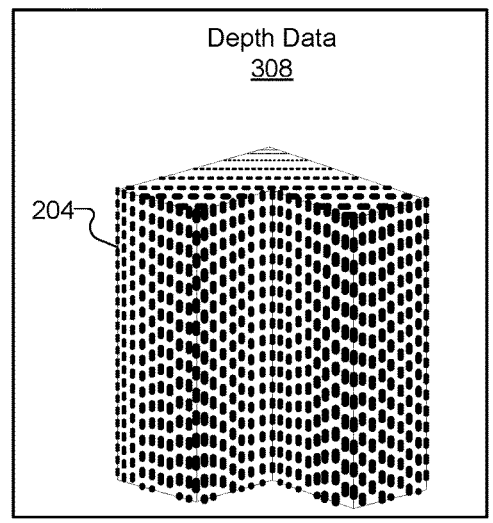
FIG. 3C illustrates an exemplary graphical depiction of depth data represented in the surface data frame captured by the 3D capture device of FIG. 3A according to principles described herein.

To illustrate how 3D capture devices 206 in configuration 200 capture surface data frames representative of real-world scene 202 (e.g., the first plurality of surface data frames in the first frame set received by real-world scene capture facility 102 as described above), FIG. 3A shows 3D capture device 206-1 capturing a surface data frame that is graphically depicted in FIGS. 3B and 3C.

As shown in FIG. 3A (and as similarly depicted in FIG. 2), 3D capture device 206-1 may be disposed with respect to real-world object 204 in real-world scene 202 so as to have vantage point 208-1 of real-world object 204. Moreover, FIG. 3A illustrates that (as with the other 3D capture devices 206 illustrated in FIG. 2) 3D capture device 206-1 may include a 2D video capture device 302 configured to capture color data (e.g., 2D video data representative of a full color or grayscale image) representative of real-world object 204 and/or other objects included within real-world scene 202, and a depth capture device 304 configured to capture depth data representative of real-world object 204 and/or other objects included within real-world scene 202.

2D video capture device 302 may be implemented by any suitable 2D video capture device (e.g., a video camera or the like) and may capture 2D video data in any manner as may serve a particular implementation. In some examples, 2D video capture device 302 may be a separate device from depth capture device 304. Collectively, such separate devices (e.g., as well as any communication interfaces and/or other hardware or software mechanisms used to functionally merge the devices) may be referred to as a 3D capture device (e.g., 3D capture device 206-1). In other examples, as shown in FIG. 3A, 2D video capture device 302 and depth capture device 304 may be integrated into a single device (i.e., 3D capture device 206-1) that captures both 2D video data and depth data as will be described.

Whether implemented as a separate device or integrated with 2D video capture device 302, depth data capture device 306 may capture depth data representative of real-world scene 202 in any manner as may serve a particular implementation. For instance, depth data capture device 306 may employ one or more depth map capture techniques such as a structured light depth map capture technique, a stereoscopic depth map capture technique, a time-of flight depth map capture technique, another suitable depth map capture technique, or any combination of depth map capture techniques as may serve a particular implementation.

Regardless of the type and number of depth map capture techniques used to capture depth data, each surface data frame generated by 3D capture device 206-1 may include both color data and depth data representative of the surfaces of real-world object 204 from vantage point 208-1. Likewise, other surface data frames captured by other 3D capture devices 206 may similarly include color data and depth data representative of the surfaces of real-world object 204 from the respective vantage points 208 associated with the other 3D capture devices 206.

FIGS. 3B and 3C illustrate exemplary graphical depictions of data representative of the surface data frame captured by 3D capture device 206-1. Specifically, as shown, the surface data frame may include at least two distinct datasets: color data 306 (shown in FIG. 3B) and depth data 308 (shown in FIG. 3C).

In FIG. 3B, color data 306 depicts real-world object 204 within real-world scene 202 as viewed from the perspective of vantage point 208-1 by 2D video capture device 302 within 3D capture device 206-1. Because color data 306 may represent a single video frame in a sequence of video frames, the depiction of real-world object 204 represented by color data 306 may represent how real-world object 204 (e.g., as well as other objects associated with real-world scene 202) appeared from vantage point 208-1 at a particular point in time. While illustrated as an image in FIG. 3B, it will be understood that color data 306 may be captured, encoded, formatted, transmitted, and represented in any suitable form. For example, color data 306 may be digital data that is formatted according to a standard video encoding protocol, a standard image format, or the like. In some examples, color data 306 may represent a color image (e.g., similar to a color photograph) of the objects in real-world scene 202. Alternatively, in other examples, color data 306 may be a grayscale image representative of the objects (e.g., similar to a black and white photograph).

In FIG. 3C, depth data 308 also (like color data 306) depicts real-world object 204 within real-world scene 202 from the perspective of vantage point 208-1. However, rather than representing the visible appearance of real-world object 204 (i.e., representing in color or grayscale how light interacts with the surfaces of real-world object 204), depth data 308 may represent the depth (i.e., the distance or position) of each point on the surface of real-world object 204 (e.g., as well as other objects within real-world scene 202) relative to, for example, depth capture device 304 in 3D capture device 206-1. As with color data 306, depth data 308 may be captured, encoded, formatted, transmitted, and represented in any suitable form. For example, as shown, depth data 308 may be represented by grayscale image data (e.g., six or eight bits for each pixel captured by depth capture device 304). However, rather than representing how light reflects from the surfaces of real-world object 204 (i.e., as represented in color data 306), the grayscale image of depth data 308 may represent, for each pixel in the image, how far away the point represented by that pixel is from depth capture device 304. For example, points that are closer to depth capture device 304 may be represented with values that represent darker shades of gray (e.g., binary values closer to 0b111111 in the case of a six-bit implementation where 0b111111 represents black). Conversely, points that are farther away from depth capture device 304 may be represented with values that represent lighter shades of gray (e.g., binary values closer to 0b000000 in the case of the six-bit implementation where 0b000000 represents white).

Figure 4:
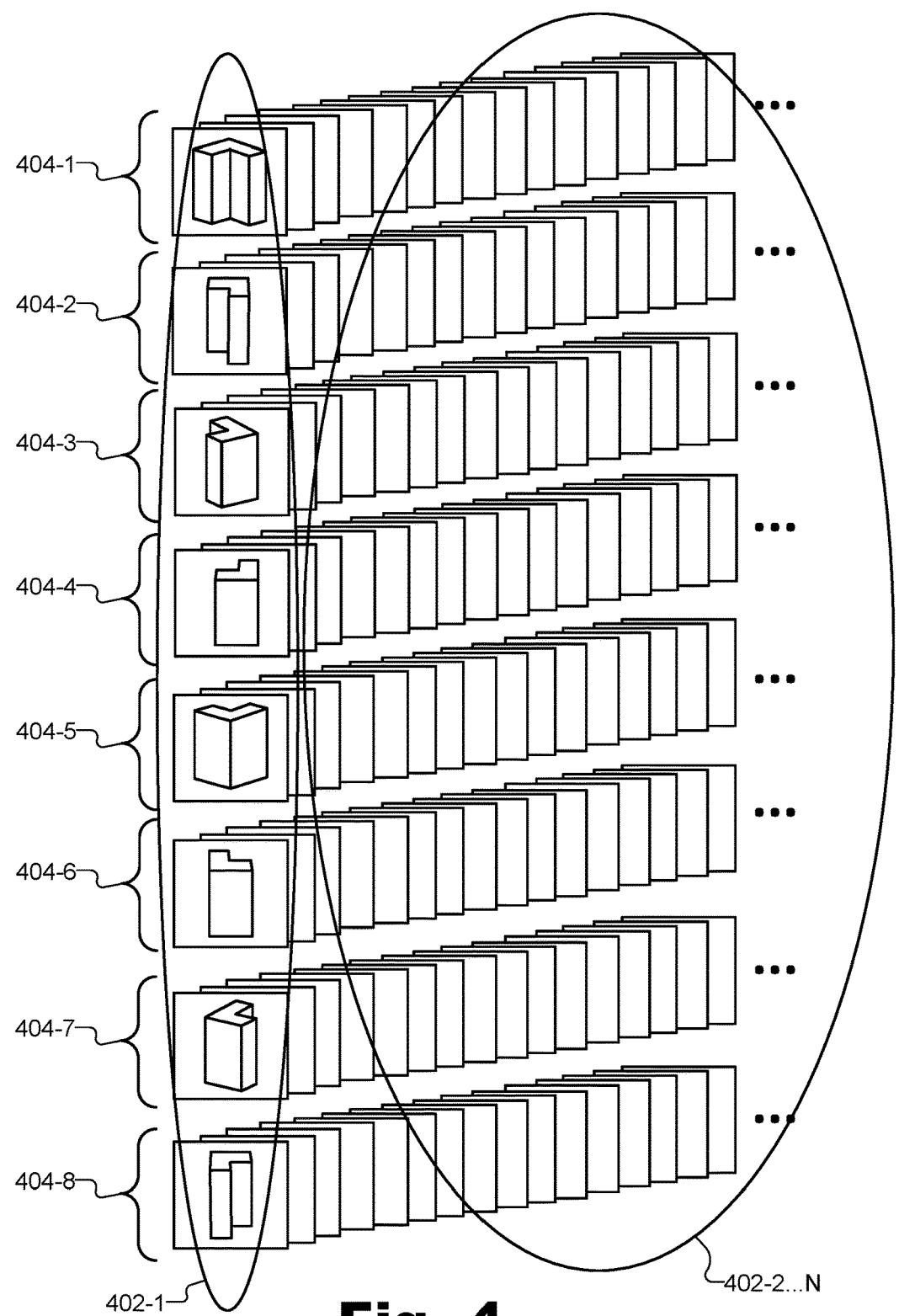
FIG. 4 illustrates an exemplary plurality of frame sets each including a respective plurality of exemplary surface data frames captured by the 3D capture devices of FIG. 2 to represent the real-world scene of FIG. 2 from different vantage points according to principles described herein.

As mentioned above, real-world scene capture facility 102 may receive (e.g., from 3D capture devices 206, as described in relation to FIGS. 2 and 3A-3C) a first frame set including a first plurality of surface data frames, as well as one or more other frames sets including respective pluralities of other surface data frames. To illustrate, FIG. 4 shows an exemplary plurality of frame sets 402 (e.g., frame sets 402-1 through 402-N) each including a respective plurality of exemplary surface data frames captured by 3D capture devices 206 to represent real-world scene 202 from different vantage points 208. While the depictions of real-world object 204 on the surface data frames shown in FIG. 4 may appear to be analogous to the depiction of real-world object 204 in color data 306, it will be understood that each surface data frame may include color data (e.g., analogous to color data 306), depth data (e.g., analogous to depth data 308), and/or any other suitable data as may be used to represent the surfaces of real-world object 204 and/or other objects included within real-world scene 202.

FIG. 4 further shows frame sequences 404 (e.g., frame sequences 404-1 through 404-8) to illustrate how respective sequences of video frames may be captured by each individual 3D capture device 206, as was mentioned above. Specifically, for instance, frame sequence 404-1 may represent a sequence of surface data frames captured at sequential points in time by 3D capture device 206-1, frame sequence 404-2 may represent a sequence of surface data frames captured at the same sequential points in time by 3D capture device 206-2, and so forth. Accordingly, as illustrated by frame set 402-1 and the different perspectives of real-world object 204 depicted therein, real-world scene 202 may be represented as viewed from different vantage points 208 in different surface data frames included in a particular frame set (e.g., frame set 402-1). For example, the first surface data frame included in frame set 402-1 (i.e., the surface data frame illustrated at the top and included within frame sequence 404-1) may be representative of color data and depth data captured from vantage point 208-1, the second surface data frame included in frame set 402-1 (i.e., the surface data frame included within frame sequence 404-2) may be representative of color data and depth data captured from vantage point 208-2, and so forth. The same may also be the case for each of the other frame sets 402 (i.e., frame sets 402-2 through 402-N, labeled as "402-2 . . . N") that come in sequence after frame set 402-1.

Returning to FIG. 1, merged reality entity state tracking facility 104 may include one or more physical computing components (e.g., hardware and/or software components separate from those of real-world scene capture facility 102 or shared with real-world scene capture facility 102) that perform various operations associated with preparing, generating, and/or maintaining entity description data to be used for generating a merged reality scene based on a virtual object and on a real-world object represented from different vantage points in different video data streams. For example, merged reality entity state tracking facility 104 may generate a transport stream based on the first frame set (e.g., frame set 402-1) that real-world scene capture facility 102 received from the plurality of 3D capture devices (e.g., 3D capture devices 206), as well as on a plurality of other frame sets (e.g., frame sets 402-1 through 402-N) that real-world scene capture facility 102 received and that were captured at other points in time (e.g., immediately before and/or after the capture of the first frame set so as to represent real-world scene 202 over a period of time).

As used herein, "data streams" and "transport streams" may refer to data structures used to package data for purposes of facilitating transmission (i.e., transport) of the data from one device or system to another, rendering or otherwise processing or analyzing the data, or for other purposes as may serve a particular implementation. In some examples, as used herein, "a transport stream" may refer to a single transport stream that includes one or more other data streams such as one or more video data streams, and/or may include other data such as metadata or the like. For example, the transport stream generated by merged reality entity state tracking facility 104 may include a color video data stream and a depth video data stream for each of the 3D capture devices in the plurality of 3D capture devices (e.g., 3D capture devices 206). In other words, the single transport stream may be used to transport all of the video data streams (e.g., one color video data stream for each 3D capture device and one depth video data stream for each 3D capture device) as well as any metadata or other suitable data that system 100 may include for transport in a particular implementation. In other examples, as used herein, "a transport stream" may refer to a plurality of transport streams that collectively transport all the video data streams. For instance, "a transport stream" may refer to a collection of individual transport streams that each include the color video data stream and the depth video data stream of a different particular 3D capture device, or that each include a plurality of color and/or depth video data streams as may serve a particular implementation.

Figure 5:
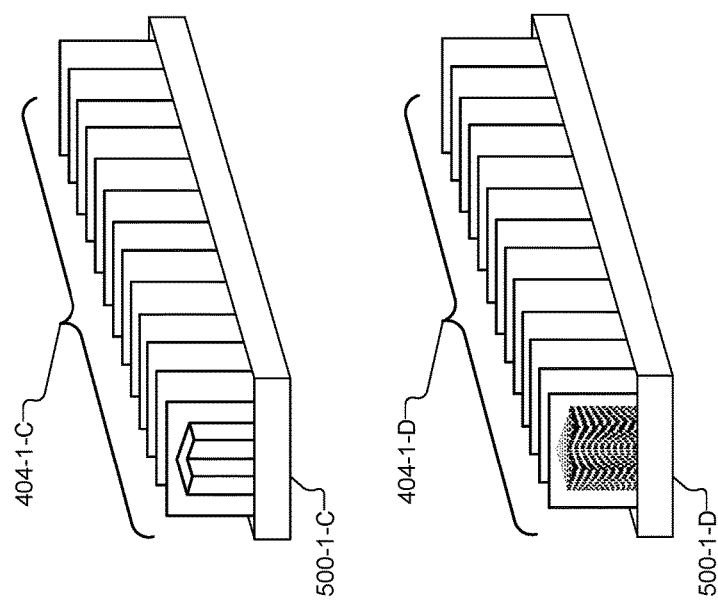
FIG. 5 illustrates an exemplary color video data stream and an exemplary depth video data stream, both based on surface data frames captured by a particular 3D capture device of FIG. 2 to represent the real-world scene of FIG. 2 from a particular vantage point according to principles described herein.

To illustrate, FIG. 5 shows an exemplary color video data stream 500-1-C and an exemplary depth video data stream 500-1-D, both based on surface data frames captured by a particular 3D capture device 206 to represent real-world scene 202 from a particular vantage point 208. Specifically, as shown, color video data stream 500-1-C may include color data portions of surface data frames included within frame sequence 404-1 (labeled as frame sequence 404-1-C to indicate the color ('C') portion of the frame sequence as opposed to the depth portion of the frame sequence), while depth video data stream 500-1-D may include depth data portions of surface data frames included within frame sequence 404-1 (labeled as frame sequence 404-1-D to indicate the depth ('D') portion of the frame sequence as opposed to the color portion of the frame sequence).

Color video data stream 500-1-C is so labeled to indicate that the video data stream is associated with the first ('1') perspective on real-world scene 202 (i.e., associated with 3D capture device 206-1, vantage point 208-1, frame sequence 404-1, etc.) and is associated with color ('C') data rather than depth data. Similarly, depth video data stream 500-1-D is so labeled to indicate that the video data stream is also associated with the first ('1') perspective on real-world scene 202, but is associated with depth ('D') data rather than color data. It will be understood that additional video data streams 500 (i.e., video data streams 500 illustrated in other FIGS. herein but not illustrated in FIG. 5) may be labeled and referenced in a similar way. Video data streams 500 (e.g., video data streams 500-1-C, 500-1-D, and other video data streams 500 referred to herein) may be generated, stored, transmitted, and/or otherwise implemented using any protocols, formats, or the like as may serve a particular implementation. For example, in certain implementations, color and depth data from frame sequences 404-1-C and 404-1-D (e.g., as well as color and/or depth data from one or more additional frame sequences) may be represented within separate portions (e.g., separate tiles, sprites, etc.,) of each frame of a single video data stream using a tile mapping or texture atlasing technique.

Figure 6:
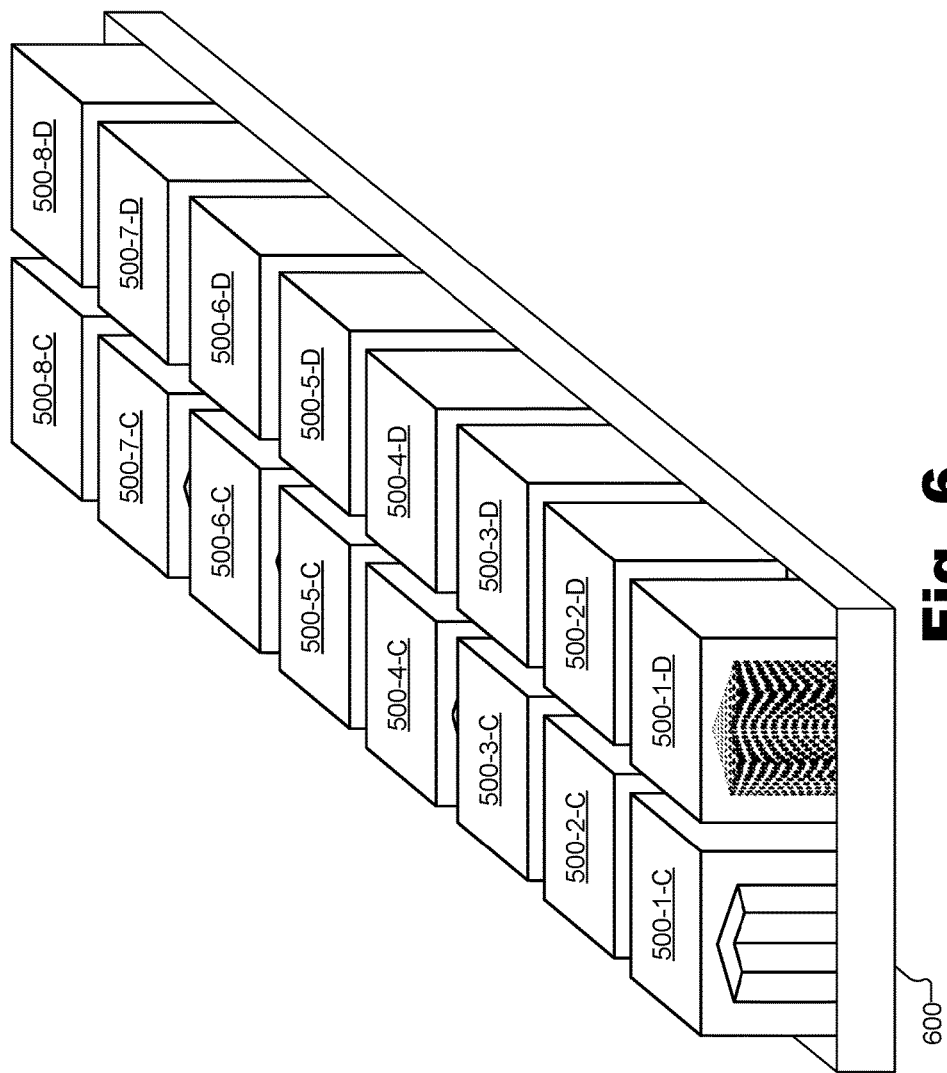
FIG. 6 illustrates an exemplary transport stream that includes the color video data stream and the depth video data stream from FIG. 4 along with other color video data streams and depth video data streams according to principles described herein.

FIG. 6 illustrates an exemplary transport stream 600 that includes color video data stream 500-1-C and depth video data stream 500-1-D along with other color video data streams and depth video data streams. Specifically, as shown, FIG. 6 illustrates a single transport stream 600 that includes color video data streams associated with each of the 3D capture devices 206 and vantage points 208 illustrated in FIG. 2 (i.e., color video data streams 500-1-C through 500-8-C), as well as depth video data streams associated with each of the 3D capture devices and vantage points (i.e., depth video data streams 500-1-D through 500-8-D). In other examples, transport stream 600 may be generated, stored, transmitted, and/or otherwise implemented using other protocols, formats, or the like as may serve a particular implementation. For instance, as mentioned above, data from various frame sequences may be packed into one video data stream (or into a plurality of video data streams with fewer video data streams than are shown in FIG. 6) using tile mapping techniques or the like, or separate transport streams may be used to contain each set of color and depth video data streams (e.g., one transport stream to contain video data streams 500-1-C and 500-1-D, another transport stream to contain video data streams 500-2-C and 500-2-D, and so forth).

Returning to FIG. 1, based on the transport stream generated by merged reality entity state tracking facility 104 (e.g., the color, depth, and other data included within transport stream 600), merged reality entity state tracking facility 104 may generate entity description data representative of a plurality of entities included within a 3D space of a merged reality scene. Merged reality entity state tracking facility 104 may generate the entity description data in any suitable way. For example, merged reality entity state tracking facility 104 may create, update, receive, track, maintain, analyze, organize, and/or otherwise process entity description data representative of the plurality of entities of the merged reality scene. As will be described in more detail below, merged reality entity state tracking facility 104 may also receive commands to modify the entity description data (e.g., to modify one or more of the entities such as by adding, removing, replacing, moving, rotating, enlarging, or otherwise modifying the entities) and may implement the commands by modifying entity description data. Merged reality entity state tracking facility 104 may further generate the data by interoperating with storage facility 106 to store and maintain updates to the generated data representative of dynamic changes to each entity.

As used herein, an "entity" for which entity description data is generated may refer to any real-world or virtual item that may be associated with a virtual 3D space (e.g., a 3D space of a merged reality scene). For example, among the entities for which merged reality entity state tracking facility 104 generates data, the 3D space of the merged reality scene may include virtual entities such as one or more virtual objects and/or a plurality of virtual viewpoints into the 3D space (e.g., which may be analogous to virtual capture devices positioned and angled in particular ways with respect to the 3D space so as to capture the 3D space from a variety of different perspectives), real-world entities for which data was captured by the 3D capture devices as described above (e.g., real-world object 204 for which data was captured by 3D capture devices 206), and/or any other real-world or virtual entities as may serve a particular implementation.

As will be described in more detail below, each entity included within the 3D space for which entity description data is generated may be defined in the entity description data in any way as may serve a particular implementation. For example, the entity description data itself (e.g., which may be stored in storage facility 106, as described below) may include data defining a state of a particular entity within the 3D space such as coordinate information associated with a position of the entity within the 3D space, orientation information associated with an orientation of the entity within the 3D space, size information associated with how large the entity is made to appear within the 3D space, and so forth. In some examples, however, certain information associated with the particular entity (e.g., binary information representative of 3D models, textures, etc.) may not be maintained as part of the entity description data directly, but rather may be maintained elsewhere and linked to from the entity description data.

For example, the plurality of entities for which merged reality entity state tracking facility 104 generates entity description data may include a virtual object at least partially defined in the entity description data by links to color data and depth data of surfaces of the virtual object that are stored within an asset storage system communicatively coupled to and/or integrated within system 100. The plurality of entities may further include, for example, real-world object 204 captured by 3D capture devices 206 described above. As such, real-world object 204 may be at least partially defined in the entity description data by links to the color data and the depth data of the surfaces of real-world object 204 included within color video data streams and depth video data streams included in the transport stream (e.g., color video data streams 500-1-C through 500-8-C and depth video data streams 500-1-D through 500-8-D included within transport stream 600). Moreover, the plurality of entities may include a plurality of virtual viewpoints into the 3D space from which a second frame set including a second plurality of surface data frames are to be rendered. For example, in contrast with the surface data frames included within the first frame set (i.e., frame set 402-1) and the other frame sets described above (i.e., frame sets 402-2 through 402-N), which represent color and depth data of real-world object 204 in real-world scene 202, the second plurality of surface data frames included in the second frame set may be rendered to represent color data and depth data of the surfaces of both real-world object 204 and one or more virtual objects included within the 3D space of the merged reality scene. The second frame set and additional frame sets representative of both real-world and virtual objects will be illustrated and described in more detail below.

In some examples, system 100 (e.g., merged reality entity state tracking facility 104 or another facility of system 100) may generate an entity description frame representative of a state of at least one entity. For instance, system 100 may generate the entity description frame based on the entity description data representative of the plurality of entities generated by merged reality entity state tracking facility 104. The entity description frame may be representative of one or a few entities, or, in some examples, may be representative of all of the real-world and virtual entities in the plurality of entities within the 3D space of the merged reality scene at a particular point in a temporal sequence (e.g., a particular moment in real time, a particular point representing a moment on a virtual timeline unrelated to real time, etc.).

As used herein, an "entity description frame" may refer to a dataset (e.g., including object description data represented in a language such as Java Script Object Notation ("JSON") or the like) that describes a state of one or more entities included in a 3D space of a merged reality scene. For example, an entity description frame may include data describing each of several entities included in the 3D space at a particular point in a temporal sequence. For instance, the entity description frame may include state data such as the coordinate information, orientation information, size information, and other types of state data described above, as well as one or more movement vectors for each entity, colors and/or textures for various surfaces of each entity, and/or any other state data that may be used to describe particular entities at the particular point in the temporal sequence as may serve a particular implementation. In some examples, the entity description frame may include the links (e.g., to the asset storage system for a virtual object, to the transport stream for a real-world object, etc.) that are included in the entity description data as described above. Exemplary entity description frames will be described and illustrated in more detail below.

Once system 100 has generated the entity description frame, system 100 may provide the entity description frame to a plurality of server-side 3D rendering engines associated with a content provider system (e.g., a virtual reality media content system that incorporates system 100, the 3D rendering engines, and other server-side systems and components described herein). As used herein, "server-side" may refer to a server side (e.g., a provider's side) of a server-client transaction such as a transaction where a content provider system provides content (e.g., virtual reality media content) to a client device used by an end user. For example, as will be described in more detail below, a virtual reality media content provider system may provide virtual reality media content to a media player device associated with a user. As such, server-side systems and components may refer to those systems and components that are associated with (e.g., included within, implemented by, interoperate with, etc.) the content provider system to provide data (e.g., virtual reality media content) to the media player device (e.g., by way of a network). In contrast, "client-side" devices may be associated with the client device (e.g., the media player device) used by the user on the other side of the network, and may include devices that facilitate the client device with receiving the data from the content provider system (e.g., the media player device and/or other computer components operated by the user on the user's side of the network).

Accordingly, as will be illustrated and described below, 3D rendering engines may be implemented on the server side of the network (i.e., associated with system 100 and/or other elements of a content provider system) by hardware and/or software resources that may be integrated with or separate from and communicatively coupled to the hardware and/or software resources of system 100. The 3D rendering engines may each be associated with a different virtual viewpoint from the plurality of virtual viewpoints into the 3D space, and may be configured to render (e.g., each based on the same entity description frame provided by system 100), a different respective surface data frame included in the second plurality of surface data frames in the second frame set (i.e., the second frame set that is representative of both the real-world and virtual objects of the 3D space of the merged reality scene).

Storage facility 106 may store and/or maintain any suitable data received, generated, managed, tracked, maintained, used, and/or transmitted by facilities 102 or 104 in a particular implementation. For example, as shown, storage facility 106 may include real-world object data 108, which may include data (e.g., captured color and/or depth data, state data, entity description data, etc.) associated with one or more real-world objects (e.g., real-world object 204) included within a 3D space of a merged reality scene, as well as virtual entity data 110, which may include data (e.g., color and/or depth data, state data, entity description data, etc.) associated with one or more virtual objects or virtual viewpoints into the 3D space. Additionally, storage facility 106 may include data associated with other types of entities included within the 3D space of the merged reality scene, instructions (e.g., programming instructions) for performing the operations described herein, and/or any other data suitable for use by facilities 102 and 104 in performing the operations described herein. For example, storage facility 106 may further include data (e.g., object description data, color data, depth data, audio data, metadata, etc.) associated with surface data frames, entity description frames, and the like. Storage facility 106 may also maintain additional or alternative data as may serve a particular implementation.

In some examples, system 100 may perform one or more of the operations described herein in real time or near-real time as events are occurring within the real-world scene. Accordingly, in implementations where system 100 is used within a virtual reality media content provider pipeline in which other systems also operate in real time, virtual reality media content (e.g., virtual reality media content including virtualized surface data frame sequences generated by system 100 in real time) may be provided to media player devices so that respective users of the media player devices, who may not be physically located near the real-world scene but who may wish to experience the real-world scene (e.g., the events occurring within the real-world scene), may virtually experience the real-world scene and the events occurring therein live (e.g., in real time or near-real time as the events are occurring) using their respective media player devices. While data processing and data distribution may take a finite amount of time such that it may be impossible for a user to experience the real-world scene precisely as events within the real-world scene occur, as used herein, an operation is considered to be performed in "real time" or "near-real time" when the operation is performed immediately and without undue delay. Accordingly, a user may be said to experience a real-world scene in real time even if the user experiences particular events within the real-world scene after a delay (e.g., a few seconds or minutes after the occurrences actually take place).

In certain examples, system 100 may be associated with various other server-side systems (e.g., 3D capture devices, scene control systems, asset storage systems, video data packaging systems, 3D rendering engines, etc.) included together in various configurations within a content provider system (e.g., a virtual reality media content provider system) in order to generate a merged reality scene based on a virtual object and on a real-world object represented from different vantage points in different video data streams and to provide data representative of the merged reality scene (e.g., as part of virtual reality media content) to be presented to a user to allow the user to experience the merged reality scene.

In some implementations, it will be understood that one or more of these other server-side systems may be integrated with (e.g., included within) system 100 or otherwise closely associated with system 100 (e.g., communicatively coupled to system 100, operated by the same or related virtual reality media provider entities, etc.). For example, in a particular implementation, system 100 may include a plurality of 3D capture devices disposed with respect to a real-world scene so as to have a plurality of different vantage points of the real-world scene by which to capture data representative of a real-world object included within the real-world scene, an asset storage system storing color and depth data representative of surfaces of a virtual object, a plurality of server-side 3D rendering engines communicatively coupled to the asset storage system, and an entity state tracking system communicatively coupled to the plurality of 3D capture devices, the asset storage system, and/or to the plurality of server-side 3D rendering engines. The entity state tracking system may be configured to perform one or more of the operations described above in relation to facilities 102 through 106. In other implementations, system 100 may be implemented as a separate, standalone system that is not integrated with these other server-side systems but, rather, is communicatively coupled to the other server-side systems and/or otherwise configured to interoperate with the other server-side systems as may serve a particular implementation.

Figure 7:
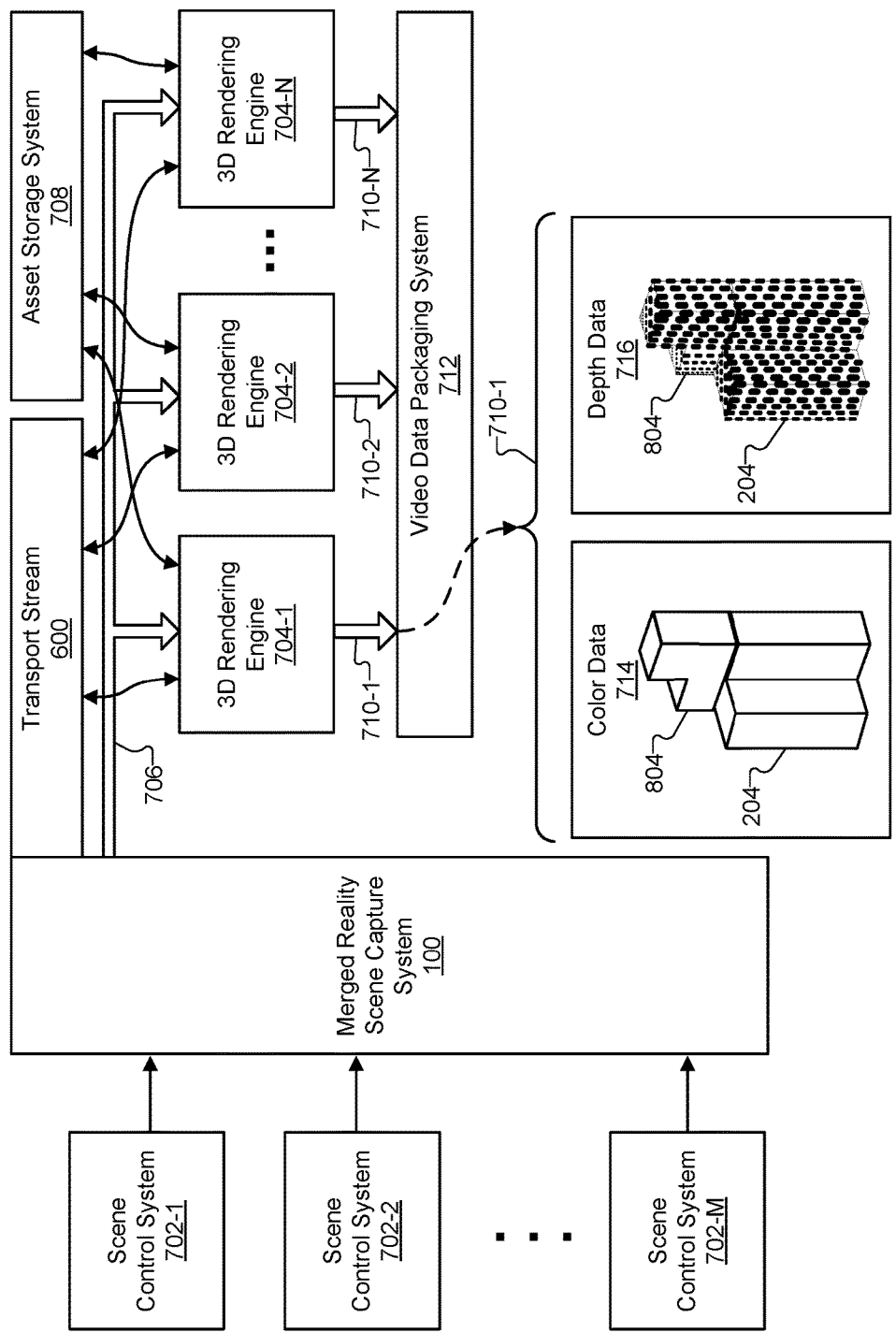
FIG. 7 illustrates an exemplary configuration in which the merged reality scene capture system of FIG. 1 facilitates generating a merged reality scene based on a virtual object and on a real-world object represented from different vantage points in different video data streams according to principles described herein.

By way of illustration, FIG. 7 shows an exemplary configuration 700 in which system 100 facilitates generating a merged reality scene based on a virtual object and on a real-world object represented from different vantage points in different video data streams. As shown in FIG. 7, an implementation of system 100 may be communicatively coupled to a plurality of scene control systems 702 (e.g., scene control systems 702-1 through 702-M) as well as to a plurality of server-side 3D rendering engines 704 (e.g., 3D rendering engines 704-1 through 704-N). For example, system 100 may be communicatively coupled to scene control systems 702 and/or to 3D rendering engines 704 by way of one or more networks (e.g., including any of the networks or network technologies described herein) or by way of other modes of communication as may serve a particular implementation. As shown in configuration 700, an entity state tracking system that performs the operations described above in relation to facilities 102 through 106 may be implemented by system 100. As mentioned above, in other implementations, system 100 may embody both an entity tracking system configured to perform these operations and one or more of the other systems and devices illustrated in configuration 700.

Based on entity description data representative of the plurality of entities (e.g., data representative of the virtual object, the real-world object, the plurality of virtual viewpoints, and other entities for which entity description data is generated by system 100 as described above), system 100 may generate an entity description frame representative of a state of at least one entity in the plurality of entities included within the 3D space of the merged reality space at a particular point in a temporal sequence. System 100 may also provide (e.g., via the communicative connection with 3D rendering engines 704) the generated entity description frame to 3D rendering engines 704 as an entity description frame 706. Based on entity description frame 706 as well as data requested and received from an asset storage system 708 (which may be communicatively coupled with 3D rendering engines 704) and from transport stream 600 (which may be stored within system 100 or within a storage facility of another suitable system), 3D rendering engines 704 may render a plurality of surface data frames 710-1 through 710-N. Specifically, surface data frames 710-1 through 710-N may implement the second frame set including the second plurality of surface data frames referred to above, and may be collectively referred to hereafter as frame set 710. As such, surface data frames 710-1 through 710-N in frame set 710 may be representative of the color data and the depth data of the surfaces of both a virtual object (e.g., a virtual object 804 described below in relation to FIG. 8) and a real-world object (e.g., real-world object 204), and may be provided to a video data packaging system 712. System 100 and transport stream 600 have been described in detail above. Each of the other systems and items illustrated in configuration 700 will now be described in more detail.

Scene control systems 702 may represent any computing systems configured to request and/or otherwise implement changes to one or more entities included in a 3D space of a merged reality scene (e.g., entities about which data is generated by system 100). For example, one or more scene control systems 702 (e.g., scene control system 702-1) may be associated with (e.g., generated by, operated by, etc.) a content creator responsible for originally generating the data representative of the entities included within the 3D space of the merged reality scene. Additionally, in certain implementations, one or more other scene control systems 702 (e.g., scene control system 702-2) may be associated with an end user that is experiencing the 3D space of the merged reality scene. For example, scene control system 702-2 may be implemented by a media player device currently rendering the entities to allow a user of the media player device to experience and interact with the entities within the 3D space of the merged reality scene.

Because system 100 may generate one unified set of data representative of all the real-world and virtual entities included within the 3D space (e.g., as opposed to separate sets of data representative of the entities for each scene control system 702), modifications to the entities may be reflected in the unified set of data as each of scene control systems 702 makes such modifications. Accordingly, multiple users (i.e., different users associated with different scene control systems 702) may all effect modifications to the same 3D space of the same merged reality scene. As a result, the modifications made by all of scene control systems 702 may be reflected in entity description frames output by system 100 (e.g., entity description frame 706), and may, in turn, be reflected in each of the surface data frames rendered by 3D rendering engines 704 (e.g., the surface data frames 710-1 through 710-N included within frame set 710).

Figure 8:
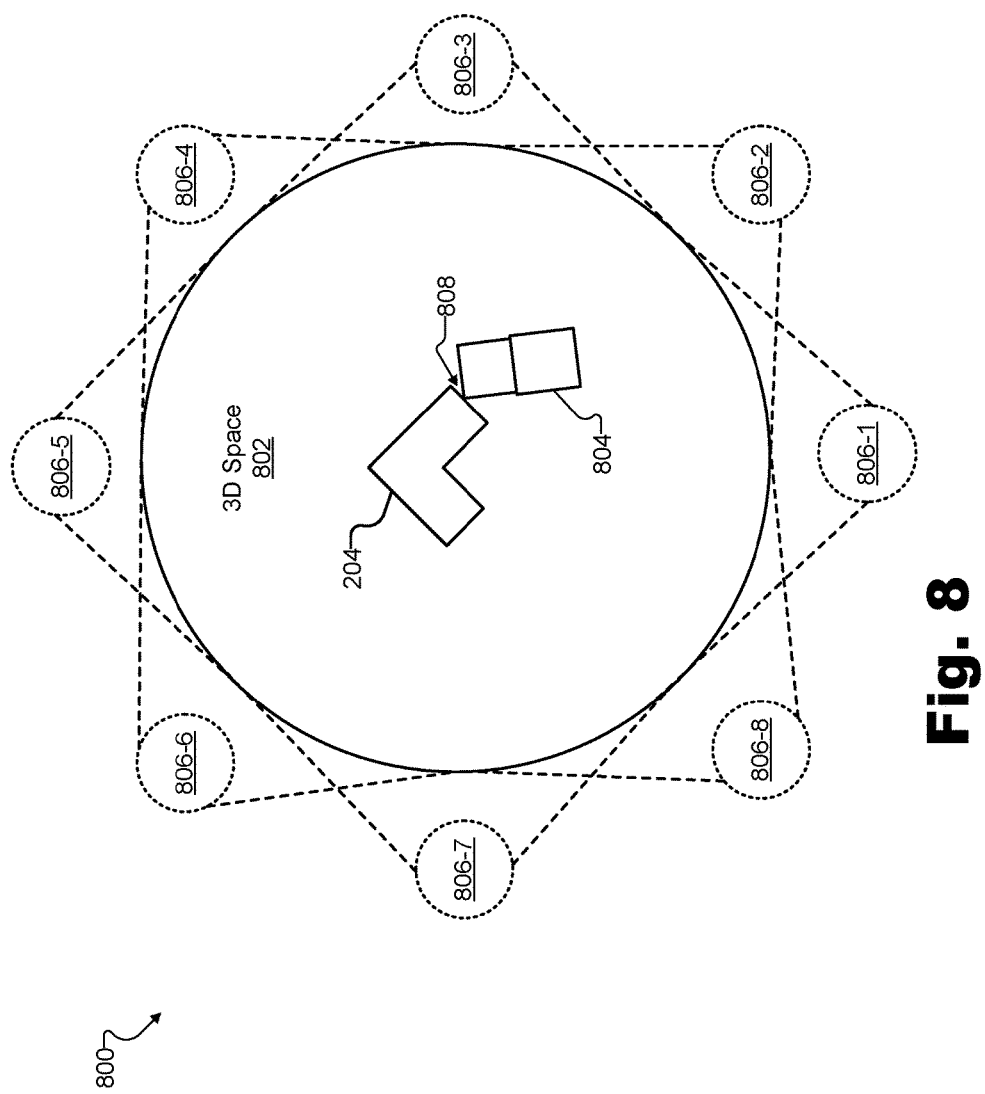
FIG. 8 illustrates an exemplary merged reality scene including an exemplary plurality of entities such as a virtual object, a real-world object, and a plurality of virtual viewpoints into an exemplary 3D space of the merged reality scene according to principles described herein.

To illustrate how scene control systems 702 may modify the entities in a 3D space, FIG. 8 shows an exemplary merged reality scene 800 including a plurality of entities. As shown, merged reality scene 800 is associated with a 3D space 802 that includes real-world object 204 (described above) as well as a virtual object 804. Objects 204 and 804 are surrounded by a plurality of virtual viewpoints 806 (e.g., virtual viewpoints 806-1 through 806-8).

As with real-world scene 202 described above, merged reality scene 800 may represent any suitable size, shape, or type of scene that includes merged reality elements (i.e., that includes a representation of at least one virtual object and at least one real-world object). For instance, as illustrated by the circular shape of 3D space 802 in FIG. 8, 3D space 802 may represent a specifically delineated area such as a stage, an arena, or the like. Conversely, in other examples, 3D space 802 may not be so well defined or delineated. For example, 3D space 802 may represent any indoor or outdoor location based on the real world (e.g., a real-world scene, event, landscape, structure, etc.) or based on an imaginary world or other virtual world, event, landscape, structure, or the like.

As described above, real-world object 204 may represent any object captured from a real-world scene (e.g., real-world scene 202) and projected into 3D space 802 of merged reality scene 800. Similarly, virtual object 804 may represent a virtual object that is projected into 3D space 802 along with real-world object 204 to generate merged reality scene 800. As such, virtual object 804 may be any virtual object, whether living or inanimate, that is detectable (e.g., viewable, etc.) from at least one of virtual viewpoints 806. As with real-world object 204, while virtual object 804 is drawn as a relatively simple geometric shape for the sake of clarity, it will be understood that virtual object 804 may represent various types of objects having various levels of complexity. Rather than a geometric shape, for instance, virtual object 804 could represent any animate or inanimate object or surface, such as a person or another living thing, a non-transparent solid, liquid, or gas, a less discrete object such as a wall, a ceiling, or a floor, or any other type of object described herein or as may serve a particular implementation. Also like real-world object 204, virtual object 804 may include various surfaces such that virtual object 804 may look different when viewed from each different virtual viewpoint 806, as will be illustrated below.

Virtual viewpoints 806 into 3D space 802 are also illustrated within merged reality scene 800. As used herein, a virtual viewpoint "into" a 3D space may refer to a virtual viewpoint that is positioned, angled, oriented, etc., with respect to the 3D space in any suitable way. For example, a virtual viewpoint into a 3D space may be a virtual viewpoint that is included within the 3D space, is outside of the 3D space with a perspective looking into the 3D space, is surrounding the 3D space along with other virtual viewpoints, and/or is otherwise associated with the 3D space in any suitable way so as to provide a view of at least some portion of the 3D space.

As used herein, "virtual viewpoints" such as virtual viewpoints 806 may be analogous to, yet different from, "vantage points" described in relation to 3D capture devices capturing a real-world scene (e.g., such as vantage points 208 of 3D capture devices 206 from which real-world scene 202 was described as being captured in relation to FIG. 2, above). Specifically, virtual viewpoints may be analogous to vantage points in that sense that both are associated with particular locations, angles, and/or perspectives from which to view a certain type of scene or 3D space. In this way, virtual viewpoints may be thought of as virtual 3D capture devices analogous to the real, physical 3D capture devices described herein. However, while vantage points may correlate with physical 3D capture devices that are disposed at real-world locations, virtual viewpoints may exist only as a virtual concept.

For instance, in an example in which a 3D space of a merged reality scene is based on a real-world scene, virtual viewpoints may correlate with virtual locations associated with the real-world scene (e.g., virtual locations such as the locations of the vantage points from which the real-world scene is captured). However, whether the 3D space is based on a real-world scene or a virtual scene, virtual viewpoints may be virtual only, and thus may not necessarily correspond to any physical 3D capture devices disposed at real-world locations. As a result, a first spatial configuration of a plurality of different vantage points of a real-world scene (e.g., vantage points 208 of real-world scene 202) may be independent from a second spatial configuration of a plurality of virtual viewpoints into a 3D space of a merged reality scene (e.g., virtual viewpoints 806 into 3D space 802). For example, even if 3D space 802 is based on real-world scene 202, which has been captured by 3D capture devices 206 disposed at vantage points 208, virtual viewpoints 806 do not necessarily have to line up with vantage points 208 in certain examples, but rather may be independent from (i.e., located at different respective locations and/or having different respective angles and perspectives on the scene from) vantage points 208. In other examples, virtual viewpoints 806 may line up with and/or correlate with (e.g., be dependent on) respective vantage points 208.

As shown, each virtual viewpoint 806 may be represented in FIG. 8 with a labeled circle disposed at a particular location with respect to 3D space 802. Each virtual viewpoint is depicted with dotted lines emanating therefrom to illustrate a field of view associated with the virtual viewpoint 806. The positions associated with virtual viewpoints 806 may be fixed with respect to 3D space 802, although, as will be described below, it may be possible for the fixed positions to be modified by one of scene control systems 702. Additionally, in some examples, it will be understood that both 3D space 802 and virtual viewpoints 806 may be moving through merged reality scene 800 together (e.g., such as a vehicular 3D space like a spaceship, a hot air balloon, or the like). As shown, the fixed positions at which virtual viewpoints 806 are disposed may, in some examples, surround 3D space 802 along at least two dimensions associated with 3D space 802 (e.g., along a plane such as the ground). In other examples, positions 806 may further surround 3D space 802 along three dimensions (e.g., by including positions 806 above and below 802 as well).

While each of virtual viewpoints 806 illustrated in FIG. 8 are angled inwardly toward 3D space 802 so as to capture 3D space 802 from various angles to enable 3D space 802 to later be rendered from arbitrary virtual viewpoints, it will be understood that, in certain examples, one or more of virtual viewpoints 806 may be angled outwardly (i.e., away from 3D space 802) to get a perspective on objects surrounding 3D space 802. For instance, a 360-degree virtual viewpoint may be positioned in the middle of 3D space 802 (not explicitly shown) to provide data representative of real-world and/or virtual objects included within 3D space 802 from additional perspectives and/or data representative of virtual objects outside of 3D space 802.

FIG. 8 further illustrates exemplary modifications that may be made to merged reality scene 800. In some examples, system 100 may receive a command to modify the entity description data representative of the plurality of entities (i.e., data representative of real-world object 204, virtual object 804, virtual viewpoints 806, and/or any other entities included in 3D space 802), and, in response to the receiving of the command, may modify the entity description data representative of the plurality of entities in accordance with the command. For example, the command may be sent (e.g., by way of a web socket or another suitable type of communication) by any of scene control systems 702 using JSON code or another suitable object description code describing the modification that is to be made.

The entities included within merged reality scene 800 may be modified in any suitable manner, which may be determined in part by the type of the entity being modified. For example, if the entity being modified is a virtual object, the modifying of the entity description data representative of the plurality of entities in accordance with the command may include adding an additional virtual object to the plurality of entities. Additionally or alternatively, the modifying may include replacing the virtual object included within the plurality of entities with an additional virtual object, removing the virtual object from the plurality of entities, modifying at least one property of a virtual object included in the plurality of entities, and/or otherwise modifying the virtual object with respect to other entities and/or with respect to the 3D space of the merged reality scene.

If the entity being modified is a real-world object (e.g., real-world object 204), the modifying of the entity description data may be performed in the same or similar ways as described above for virtual objects. However, it will be understood that, due to the manner of capturing data associated with a real-world scene, an entire real-world scene (e.g., including various distinct real-world objects) may be treated as a single real-world object unless metadata differentiating one real-world object from another within the real-world scene is associated with the captured data representative of the real-world scene. For example, system 100 may be configured to receive metadata associated with the first frame set (e.g., frame set 402-1 representative of objects within real-world scene 202) that differentiates the color data and the depth data of the surfaces of real-world object 204 from other color data and other depth data representative of other surfaces of other additional real-world objects included within real-world scene 202 at a same particular point in time (i.e., real-world objects included within real-world scene 202 that are not explicitly shown in FIG. 2 or FIG. 8). As such, the plurality of entities included within 3D space 802 of merged reality scene 800 for which the entity description data is generated may further include one or more of the other additional real-world objects. The additional real-world objects may be at least partially defined in the entity description data by links to the other color data and the other depth data representative of the other surfaces of the additional real-world objects included within the color video data stream and the depth video data stream (i.e., color video data stream 500-1-C and depth video data stream 500-1-D within transport stream 600). Additionally, the links to the color data and the depth data of the surfaces of real-world object 204 and the links to the other color data and the other depth data representative of the other surfaces of the additional real-world objects may be based on the metadata differentiating the color data and the depth data of the surfaces of real-world object 204 from the other color data and the other depth data representative of the other surfaces of the additional real-world object.

If the entity being modified is a virtual viewpoint (e.g., one of virtual viewpoints 806), the modifying of the entity description data representative of the plurality of entities in accordance with the command may include adding an additional virtual viewpoint to the plurality of entities. Additionally or alternatively, the modifying may include modifying at least one of the plurality of virtual viewpoints included within the plurality of entities, removing at least one of the plurality of virtual viewpoints from the plurality of entities, or the like. For example, a field of view associated with one of virtual viewpoints 806 (e.g., virtual viewpoint 806-1) may be changed or turned to get a perspective on a different angle of 3D space 802. In other examples, virtual viewpoints 806 may be moved inward or outward (e.g., to create a zoomed in or zoomed out effect with respect to a particular virtual object within 3D space 802), removed from the plurality of virtual viewpoints 806, or otherwise modified. As another example, an additional virtual viewpoint may be added to the plurality of virtual viewpoints 806 to get another perspective on objects 204 and/or 804 (e.g., a perspective that is not well covered by one of virtual viewpoints 806-1 through 806-8).

As described above, in some examples, a virtual object such as virtual object 804 may be modified (e.g., moved and/or rotated with respect to 3D space 802) based on a direct command from one of scene control systems 702 to modify the virtual object. In other examples, however, a virtual object may be modified automatically (i.e., modified in the same or different ways but without being based on an explicit command from a scene control system 702) based on interactions with other entities included within 3D space 802. More specifically, for example, the generating by system 100 of the entity description data representative of the plurality of entities may include creating a virtual interaction between objects (e.g., between virtual objects, between differentiated real-world objects, between a virtual object a real-world object, etc.). For example, system 100 may create (e.g., generate, track, simulate, etc.) a virtual interaction between virtual object 804 and real-world object 204, and the virtual interaction may be based on at least one of a physics-based object behavior and an AI-based object behavior.

For instance, a physics-based object behavior 808 is illustrated in FIG. 8. System 100 may determine that virtual object 804 and real-world object 204 each represent solid virtual objects that cannot exist in the same virtual space. Accordingly, as illustrated by physics-based object behavior 808, locational and orientational properties of virtual object 804 may be modified in accordance with physics rules such that virtual object 804 appears to interact with (e.g., run up against, "bump" into, etc.) real-world object 204. Other physics-based object behaviors may mimic other rules of physics (e.g., real-world physics or imaginary physics that apply only in a virtual world) that define how objects interact with one another and with physical forces and principles (e.g., gravity, momentum, friction, buoyancy, light reflection, etc.). These physics-based object behaviors may also be applied to the entity description data representative of the plurality of entities included within 3D space 802 by system 100. Moreover, AI-based object behaviors may also help define how real-world and/or virtual objects interact with one another and with the environment in which the objects are placed. For example, AI-based object behaviors may be particularly applicable with entities representing living things (e.g., avatars, people, animals, etc.) who may use artificial intelligence to make "choices" such as where to walk within 3D space 802, who to talk to and what to say, when to run from danger, and so forth.

Returning to FIG. 7, system 100 generates entity description frames representative of the states of the entities in the plurality of entities at particular points in a temporal sequence (e.g., a real time sequence, a virtual timeline associated with time in a virtual world, etc.). For example, as shown, system 100 may generate a particular entity description frame (i.e., entity description frame 706), and may provide entity description frame 706 to each of 3D rendering engines 704. 3D rendering engines 704 may be server-side 3D rendering engines (e.g., 3D rendering engines across a network and/or otherwise separated from client-side devices such as media player devices used by users). In some examples, 3D rendering engines 704 may be implemented by separate devices (e.g., separate servers, separate processors within a server, etc.) or by separate software processes (e.g., separate instruction threads, etc.), while in other examples, 3D rendering engines 704 may be integrated together into common hardware and/or software devices or processes as may serve a particular implementation. In some implementations, 3D rendering engines may be jointly operated with or even fully integrated into a merged reality scene capture system such as system 100, while in other implementations 3D rendering engines may be operated separately (e.g., by a different entity providing cloud-based processing services or the like).

Certain entity description frames provided to 3D rendering engines 704 may be key description frames that include state data representative of all the entities associated with the merged reality scene (i.e., merged reality scene 800) at a particular point in the temporal sequence, while other entity description frames may be update description frames representative of a state (e.g., at a particular point in the temporal sequence) of only those entities associated with the merged reality scene that have been modified since a previous key description frame was generated representing the state of all the entities at a previous point in the temporal sequence.

Figure 9:
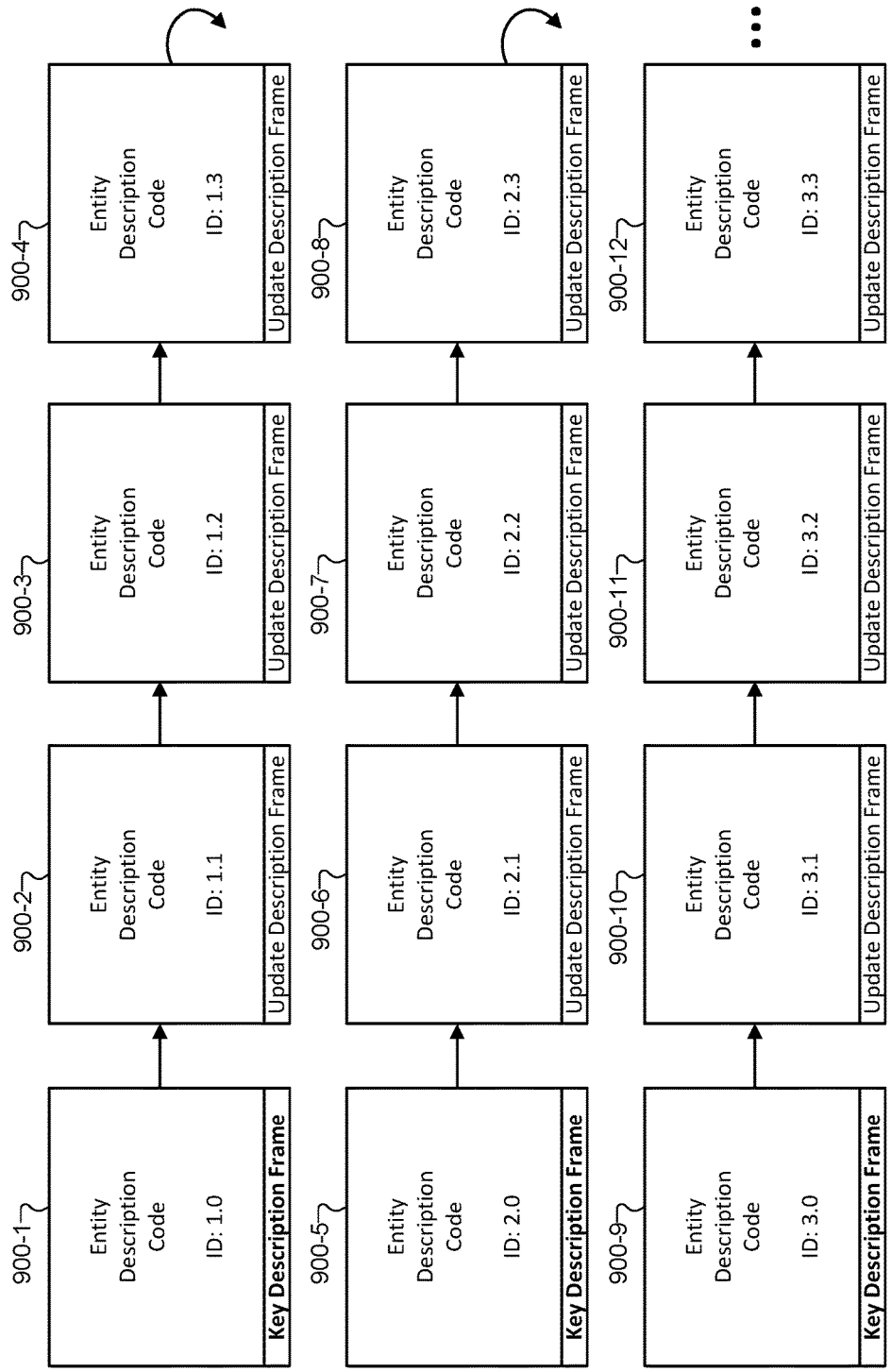
FIG. 9 illustrates exemplary entity description frames that may be generated by the merged reality scene capture system of FIG. 1 according to principles described herein.

By way of illustration, FIG. 9 shows a plurality of exemplary entity description frames 900 (e.g., entity description frames 900-1 through 900-12) that may be generated by system 100. As indicated by arrows pointing from one entity description frame 900 to another, entity description frames 900 may be ordered in a temporal sequence starting with entity description frame 900-1 and progressing to entity description frame 900-12, after which the temporal sequence may progress to additional entity description frames 900 that are not explicitly shown in FIG. 9. Along the bottom of each entity description frame 900, the type of entity description frame (e.g., key description frame or update description frame) is indicated. Specifically, entity description frames 900-1, 900-5, and 900-9 are indicated as being key description frames, while entity description frames 900-2 through 900-4, 900-6 through 900-8, and 900-10 through 900-12 are indicated as being update description frames.

Accordingly, in this example, each key description frame is followed in the temporal sequence by several (e.g., three) update description frames, which are in turn followed in the temporal sequence by another key description frame. It will be understood, however, that the arrangement of key description frames and update description frames shown in FIG. 9 is exemplary only, and that the arrangement of key and update description frames may be implemented in any way as may serve a particular implementation. For example, a merged reality scene that is not particularly dynamic (i.e., is not affected by a large number of modifications to entities) may be represented by relatively few key description frames followed by relatively large numbers of update description frames. Conversely, a merged reality scene that is more dynamic may be represented by a larger proportion of key description frames (up to and including exclusively key description frames) and a smaller proportion of update description frames (down to and including no update description frames).

As further shown in FIG. 9, each entity description frame 900 may include or be implemented by entity description code (e.g., JSON code, XML code, or another type of code suitable for describing state data associated with the entities for which entity description data is generated by system 100) and may be associated with a sequence number (e.g., an identification number or "ID") indicative of a position of the respective entity description frame 900 in the temporal sequence with respect to other entity description frames 900. For example, as shown, entity description frame 900-1 may have a sequence number that is a whole number (i.e., "1.0") to indicate that entity description frame 900-1 is a key description frame and to indicate the relative position of the frame with respect to other key description frames (e.g., "1.0" comes before "2.0"). Entity description frames 900-2 through 900-4 may then each be associated with sequence numbers that begin with a 1 (i.e., to indicate that these frames are updates to key description frame 1.0) and include sub-identifiers (i.e., "0.1," "0.2," and "0.3") to indicate the relative positions of the update description frames in the temporal sequence with respect to other update description frames (e.g., "1.1" comes before "1.2"). This entity description frame numbering scheme is exemplary only and any suitable frame numbering scheme may be employed as may serve a particular implementation.

Returning to FIG. 7, regardless of whether entity description frame 706 is a key description frame (e.g., such as entity description frames 900-1, 900-5, or 900-9) or an update description frame (e.g., such as the other entity description frames 900 in FIG. 9), the sequence of entity description frames including entity description frame 706 may provide all the information needed by 3D rendering engines 704 to render surface data frames depicting 3D space 802 of merged reality scene 800 from the respective virtual viewpoints with which each 3D rendering engine 704 is associated. As such, it may not be necessary that 3D rendering engines 704 receive or process entity description frames in order. Rather, 3D rendering engines 704 may render respective surface data frames 710 (e.g., which may each be generated from a single entity description frame in the sequence) in any order as may be convenient or efficient for a particular 3D rendering engine 704, and the surface data frames 710 may be reordered and synchronized later (e.g., by video data packaging system 712).

As mentioned above, certain detailed information (e.g., binary data representative of virtual object geometries, textures, etc.) representative of virtual objects may be stored in asset storage system 708 (e.g., rather than being explicitly included within entity description frame 706) and may be accessed via links to the data that are included within entity description frame 706. Asset storage system 708 may be implemented by a separate device from system 100 and/or 3D rendering engines 704 (e.g., a separate server, a separate processor and storage facility within a server, etc.), by separate software processes (e.g., separate instruction threads, etc.), or may be integrated together into common hardware and/or software devices or processes with system 100 and/or 3D rendering engines 704 as may serve a particular implementation. In some implementations, asset storage system 708 may be jointly operated with or fully integrated into a merged reality scene capture system such as system 100 and/or into a system that also includes 3D rendering engines 704, while in other implementations asset storage system 708 may be operated separately (e.g., by a different entity providing cloud-based processing services or the like).

Similarly, in certain examples, the generating of the entity description data representative of the real-world object may include generating a 3D representation of real-world object 204 included within real-world scene 202 and generating links to the color data and the depth data of the surfaces of real-world object 204 that at least partially define real-world object in the entity description data generated by system 100 as pointers to the 3D representation of real-world object 204. For example, system 100 may generate a 3D representation of real-world object 204 by rendering (e.g., in a similar way as a media player device used by a user would render) the color video data stream and the depth video data stream generated based on the first frame set and on the plurality of other frame sets (i.e., video data streams 500-1 through 500-8 that are based on frame sets 402-1 through 402-N and stored within transport stream 600). System 100 may then generate the links to the color data and depth data (i.e., pointers to the data within transport stream 600, which may be maintained within system 100 or within another suitable server-side system) and include the links within entity description frame 706.

Accordingly, entity description frame 706 may include state information representative of the entities along with links to detailed information that is stored elsewhere (e.g., within asset storage system 708 in the case of virtual objects, within transport stream 600 in the case of real-world objects, etc.) and may be accessed, based on the links in entity description frame 706, by each of 3D rendering engines 704 as needed. It is noted that, while the detailed information may be maintained separately (e.g., within transport stream 600 for real-world object data and within asset storage system 708 for virtual object data), system 100, entity description frame 706, 3D rendering engines 704, and/or other systems shown in configuration 700 may treat (e.g., render, represent, etc.) real-world objects and virtual objects in similar ways. In some examples, for instance, certain elements of configuration 700 (e.g., video data packaging system 712) may not even need to or be able to distinguish between real-world objects such as real-world object 204 and virtual objects such as virtual object 804. In other examples, there may be distinctions between real-world objects and virtual objects that are taken into account. For instance, while models for virtual objects may be relatively static, data representative of real-world objects may dynamically change in time, requiring 3D rendering engines 704 to access data associated with particular moments in time.

In any case, between data included within entity description frame 706 and data accessed from asset storage system 708 and/or transport stream 600 using links provided within entity description frame 706, 3D rendering engines 704 may access all the information necessary to render surface data frames 710 representing 3D space 802 from respective virtual viewpoints without having to rely on information maintained locally by 3D rendering engines 704.

Each 3D rendering engine 704 may be associated with one of the virtual viewpoints represented in the plurality of entities for which entity description data is generated by system 100. For example, 3D rendering engines 704-1 through 704-8 (of which only 3D rendering engines 704-1 and 704-2 are explicitly shown in FIG. 7) may be associated with virtual viewpoints 806-1 through 806-8 (illustrated in FIG. 8), respectively. As such, each 3D rendering engine 704 may render a respective surface data frame 710 as seen from the perspective (i.e., the position, angle, field of view, etc.) of the virtual viewpoint 806 with which the particular 3D rendering engine 704 is associated. Moreover, as described above, each surface data frame 710 may include not only color data (i.e., image data) representative of the appearance of virtual objects from a respective virtual viewpoint, but may also include depth data.

To illustrate, FIG. 7 shows images representative of surface data frame 710-1, which may be a surface data frame rendered by 3D rendering engine 704-1, the 3D rendering engine associated with virtual viewpoint 806-1 (see FIG. 8). As shown, surface data frame 710-1 may include both color data 714 and depth data 716, which may represent similar types of data as described above with respect to color data 306 and depth data 308 (see FIG. 3). However, in contrast with the surface data frame associated with color data 306 and depth data 308, surface data frame 710-1 may include representations of both real-world object 204 and virtual object 804, as well as any other objects that may be included within 3D space 802 of merged reality scene 800. Specifically, as shown, virtual object 804 appears to be resting on top of real-world object 204 (e.g., by way of a physics-based virtual interaction between the objects implemented by system 100).

Respective frame sets of surface data frames (e.g., frame set 710 including surface data frames 710-1 through 710-N) may be generated by 3D rendering engines 704 such that each entity description frame provided by system 100 (e.g., entity description frame 706) is associated with a respective frame set representing renderings of 3D space 802 of merged reality scene 800 from different virtual viewpoints into 3D space 802. As shown in FIG. 7, each surface data frame (e.g., including surface data frames 710-1 through 710-N) in the respective frame sets may then be provided to video data packaging system 712, which may organize, synchronize, encode, compress, combine, and/or otherwise process the surface data frames to generate respective color video data streams and depth video data streams associated with each virtual viewpoint 806.

Figure 10:
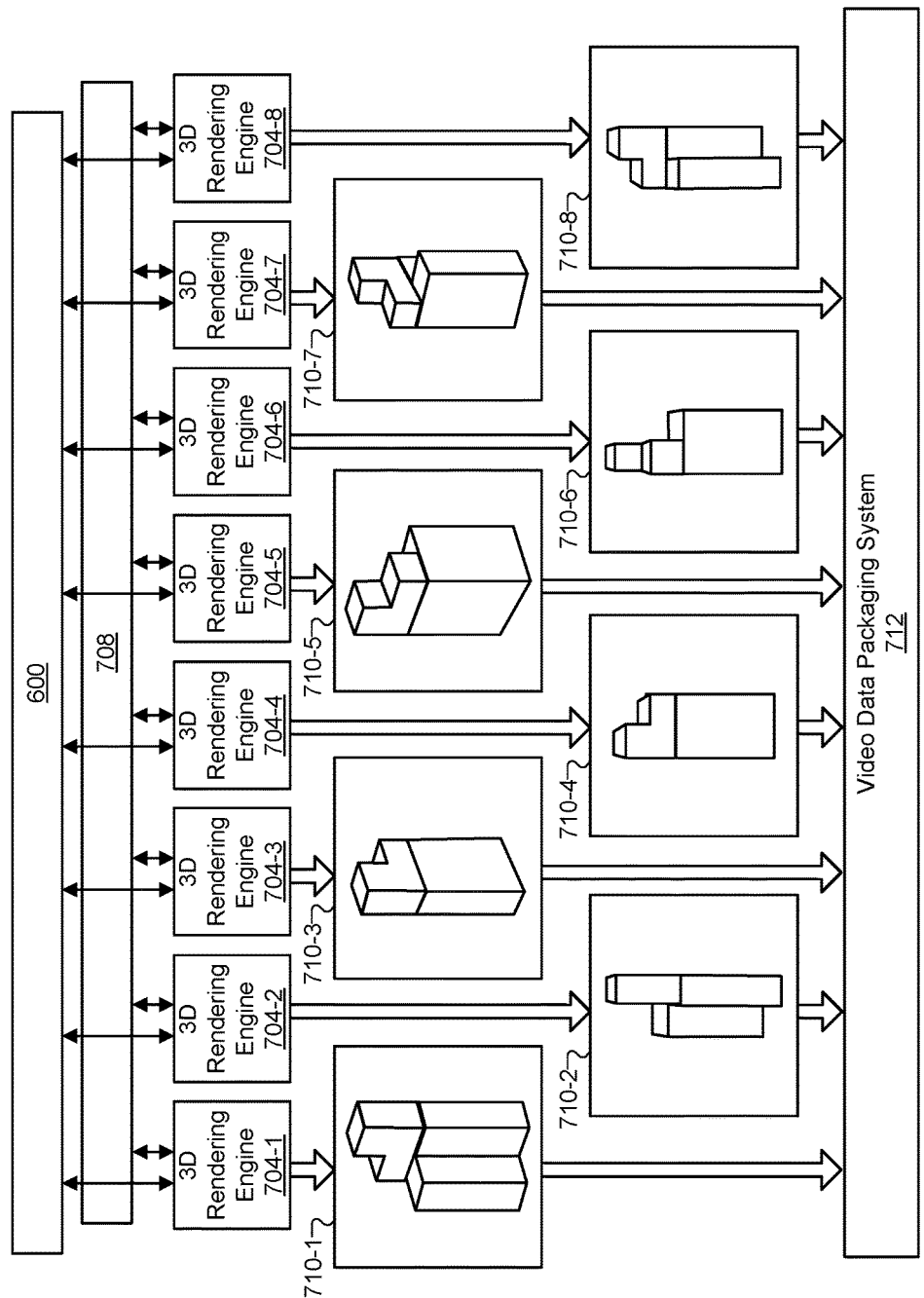
FIG. 10 illustrates a plurality of exemplary three-dimensional ("3D") rendering engines that render surface data frames representative of color data and depth data of surfaces of the virtual and the real-world objects included within the 3D space of the merged reality scene of FIG. 8 according to principles described herein.

To illustrate, FIG. 10 shows a more detailed view of certain components of configuration 700. Specifically, FIG. 10 illustrates eight 3D rendering engines 704 (i.e., 3D rendering engines 704-1 through 704-8) that render a complete set of surface data frames (i.e., frame set 710, including surface data frames 710-1 through 710-8). Surface data frames 710-1 through 710-8 may be representative of color and depth data of surfaces of real-world and virtual objects included within a 3D space of a merged reality scene. As shown, for instance, frame set 710 includes data representative of surfaces of real-world object 204 and virtual object 804 within 3D space 802 as the surfaces appear from different virtual viewpoints with respect to 3D space 802 (e.g., virtual viewpoints 806-1 through 806-8). It will be understood that, while surface data frames are shown to be represented in FIG. 10 by an image analogous to the color data image illustrated in FIG. 7 (i.e., the image illustrating color data 714), each surface data frame in frame set 710 may also include data representative of depth data, which may be represented by an image analogous to the depth data image illustrated in FIG. 7 (i.e., the image illustrating depth data 716).

3D rendering engines 704 may respectively generate surface data frames 710-1 through 710-N from the associated virtual viewpoints 806 based on entity description frame 706, as well as based on data accessed from asset storage system 708 and/or from transport stream 600, as described above. For example, the entity description data representative of the plurality of entities associated with merged reality scene 800 may include a link to color and depth data representative of virtual object 804 that is stored in asset storage system 708 and/or a link to color and depth data representative of real-world object 204 that is included within transport stream 600. As such, entity description frame 706 (which may have been generated by system 100 and provided to 3D rendering engines 704 as described above) may be generated to include the respective links to the color and depth data representative of objects 204 and 804 maintained, respectively, in transport stream 600 and asset storage system 708. Each of 3D rendering engines 704 may be configured to render their respective surface data frames 710 from their respective virtual viewpoints 806 by performing operations including receiving entity description frame 706 from system 100, and accessing the color and depth data representative of objects 204 and 804 kept, respectively, in transport stream 600 and asset storage system 708 using the links included within entity description frame 706. With both the data included within entity description frame 706 and the color and depth data accessed by way of the links, 3D rendering engines 704 may render surface data frames 710 to provide views of 3D space 802 (e.g., including both real-world object 204 and virtual object 804) from virtual viewpoints surrounding 3D space 802, as shown.

As with frame sequence 404 representative of real-world scene 202 described above, each of surface data frames 710-1 through 710-N may be included within a separate frame sequence of surface data frames representative of color and depth data of merged reality scene 800 from the respective virtual viewpoint 806 during the temporal sequence. For example, surface data frame 710-1 may be included within a first frame sequence of surface data frames representative of color and depth data of the surfaces of objects 204 and 804 visible from virtual viewpoint 806-1 during the temporal sequence, surface data frame 710-2 may be included within a second frame sequence of surface data frames representative of color and depth data of the surfaces of objects 204 and 804 visible from virtual viewpoint 806-2 during the temporal sequence, and so forth. In other words, once surface data frames 710 have been rendered, each 3D rendering engine 704 may continue to render other surface data frames in different respective sequences of surface data frames. For example, 3D rendering engines 704 may receive additional entity description frames after entity description frame 706 (e.g., such as the sequence of entity description frames 900 illustrated in FIG. 9), and may generate further surface data frames based upon the additional entity description frames.

Figure 11:
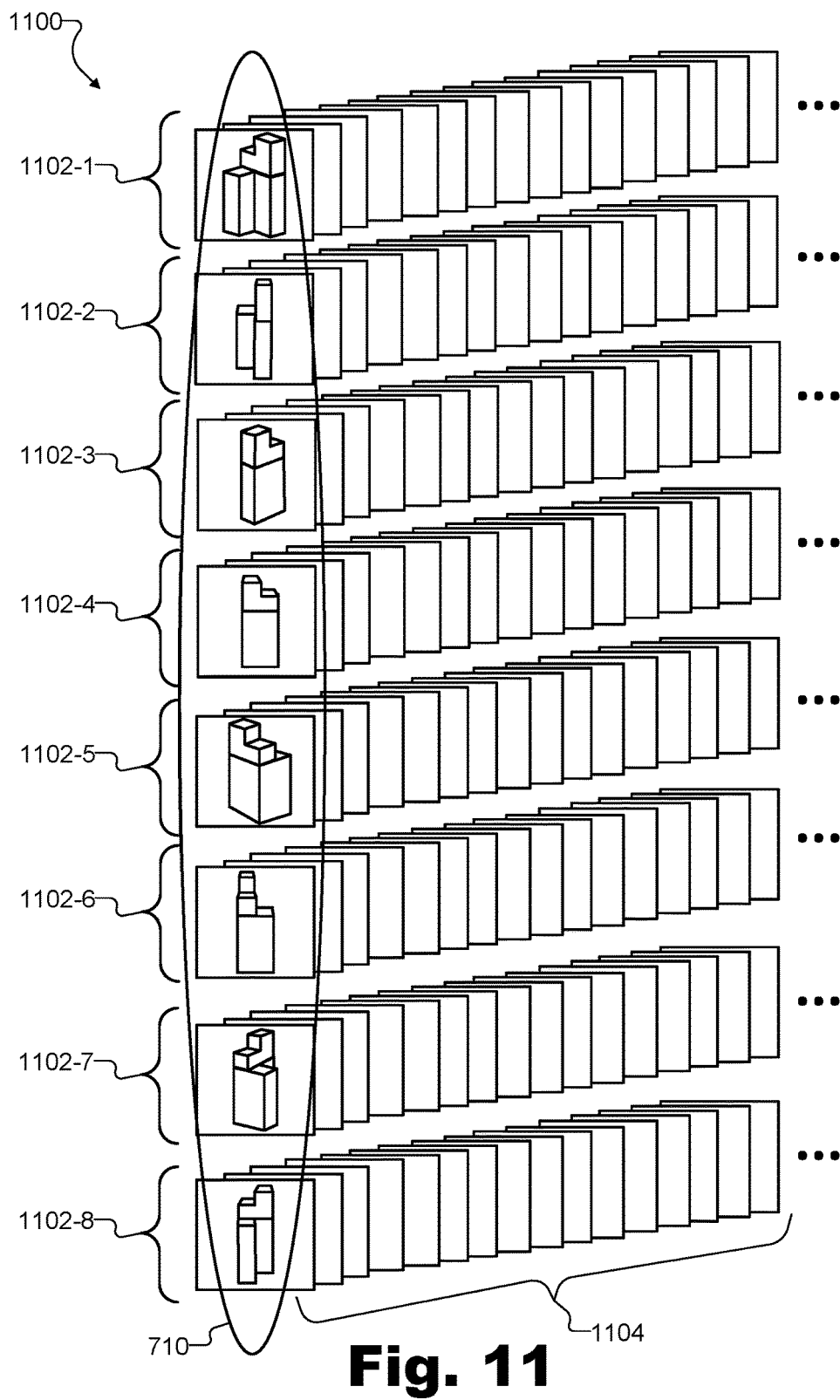
FIG. 11 illustrates an exemplary plurality of frame sets each including a respective plurality of exemplary surface data frames rendered by the 3D rendering engines of FIG. 10 according to principles described herein.

To illustrate, FIG. 11 shows a plurality of exemplary frame sequences 1102 (e.g., frame sequences 1102-1 through 1102-8) of surface data frames representative of color and depth data of surfaces of both virtual object 804 and real-world object 204 visible from vantage points 806-1 through 806-8, respectively. For example, as shown, the first surface data frames illustrated in each frame sequence 1102 (i.e., the surface data frames that are uncovered so that different views of objects 204 and 804 are visible in FIG. 11) may correspond to surface data frames 710-1 (included within frame sequence 1102-1) through 710-8 (included within frame sequence 1102-8). Accordingly, frame sequences 1102-1 through 1102-8 may be associated, respectively, with 3D rendering engines 704-1 through 704-8 and, thus, with virtual viewpoints 806-1 through 806-8. For example, frame sequence 1102-1 may represent both the color and the depth of real-world objects and virtual objects included within 3D space 802 of merged reality scene 800 as viewed from virtual viewpoint 806-1 during a particular temporal sequence 1104 (e.g., a particular period of real time, a particular virtual timeline associated with an immersive virtual reality world, etc.). Similarly, frame sequence 1102-2 may represent the color and depth of the real-world and virtual objects included within 3D space 802 as viewed from virtual viewpoint 806-2 during temporal sequence 1104, and so forth for frame sequences 1102-3 through 1102-8.

As described and illustrated above, each of the surface data frames generated by 3D rendering engines 704 and included in frame sequences 1102 may be transmitted or otherwise passed into video data packaging system 712, which may be communicatively coupled to 3D rendering engines 704. Based on each of the different frame sequences 1102 of surface data frames (e.g., based on frame set 710 and on additional frame sets following frame set 710 that include respective additional pluralities of surface data frames as shown), video data packaging system 712 may generate at least one additional transport stream (i.e., in addition to transport stream 600 that was generated previously) that includes a color video data stream and a depth video data stream for each of virtual viewpoints 806. For example, video data packaging system 712 may generate a single transport stream that contains individual color video data streams and depth video data streams associated with each frame sequence 1102 (i.e., associated with each 3D rendering engine 704 and virtual viewpoint 806), or video data packaging system 712 may generate different transports streams for the color video data stream and depth video data stream associated with each frame sequence 1102. The at least one additional transport stream may be generated in any manner described herein (e.g., in a manner similar to transport stream 600) or in any other suitable manner as may serve a particular implementation.

Once the at least one additional transport stream is generated, video data packaging system 712 may provide the at least one additional transport stream for streaming to a client-side media player device associated with a user. For example, video data packaging system 712 may stream (e.g., transmit by way of a network) the transport stream to the media player device itself, or may include the transport stream in a data pipeline in which the transport stream will be further processed and streamed to the media player device by another system (e.g., after being processed and/or repackaged by other devices, processes, and/or systems associated with the pipeline). As will be described below, the client-side media player device may be configured to generate (e.g., based on the color video data stream and the depth video data stream for each of the virtual viewpoints included within the at least one additional transport stream) a 3D representation of the 3D space of the merged reality scene to be experienced by the user from a dynamically selectable virtual viewpoint selected by the user and corresponding to an arbitrary virtual location within 3D space 802 of merged reality scene 800.

As mentioned above, in some examples, system 100 and/or other systems (e.g., other server-side systems) and devices described herein may be used to generate virtual reality media content to be experienced by users. For example, in addition to the operations described above, a virtual reality media content provider system (e.g., within which system 100, video data packaging system 712, and/or other devices and systems described herein may be included or with which these systems may otherwise be associated) may further generate and provide virtual reality media content based on the at least one additional transport stream that video data packaging system 712 generates and provides. The virtual reality media content may be representative of a merged reality scene (e.g., merged reality scene 800) and may be presentable to the user so as to be experienced from a dynamically selectable virtual viewpoint corresponding to an arbitrary virtual location with respect to the merged reality scene. For example, the dynamically selectable virtual viewpoint may be selected by the user of the media player device while the user is experiencing the merged reality scene using the media player device. Moreover, the virtual reality media content may be provided (e.g., by the virtual reality media content provider system that includes or is otherwise associated with system 100) to the media player device to allow the user to experience the merged reality scene from the dynamically selectable virtual viewpoint corresponding to the arbitrary virtual location within the merged reality scene.

Figure 12:
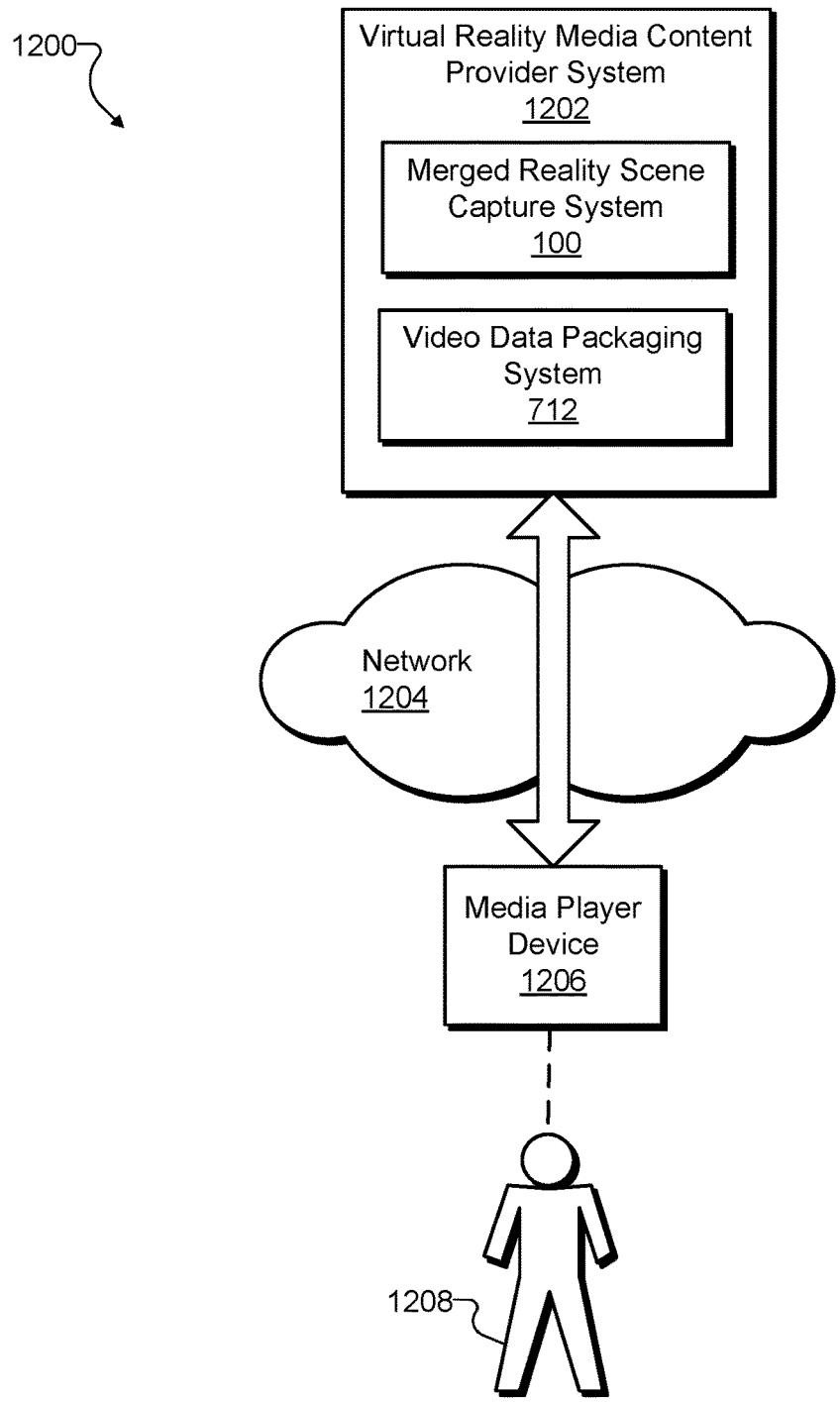
FIG. 12 illustrates an exemplary configuration in which an exemplary virtual reality media content provider system generates virtual reality media content that is provided by way of a network to an exemplary client-side media player device used by a user to experience a merged reality scene according to principles described herein.

To illustrate, FIG. 12 shows an exemplary configuration 1200 in which an exemplary virtual reality media content provider system 1202 ("provider system 1202") that includes system 100 and video data packaging system 712 generates virtual reality media content that is provided by way of a network 1204 to an exemplary client-side media player device 1206 ("media player device 1206") used by a user 1208 to experience a merged reality scene.

After the at least one additional transport stream has been generated based on frame sequences 1102 as described above, provider system 1202 may further encode, package, encrypt, or otherwise process the one or more transport streams to form virtual reality media content that media player device 1206 may be configured to render. For example, the virtual reality media content may include or be representative of a plurality of 2D video data streams (e.g., 2D video data streams associated with color data and with depth data for each virtual viewpoint 806) that may be rendered by media player device 1206 so as to present a view of merged reality scene 800 from any arbitrary virtual viewpoint within merged reality scene 800 (e.g., including virtual viewpoints other than virtual viewpoints 806 that may be of interest to user 1208), as will be described below. Additionally or alternatively, the virtual reality media content may include data representative of one or more volumetric models (e.g., 3D or 4D models) of virtual objects included within merged reality scene 800 that also may be rendered so as to be viewable from arbitrary virtual viewpoints. The virtual reality media content may then be distributed by way of network 1204 to one or more media player devices such as media player device 1206 associated with user 1208. For example, provider system 1202 may provide the virtual reality media content to media player device 1206 so that user 1208 may experience merged reality scene 800 virtually using media player device 1206.

In some examples, it may be undesirable for user 1208 to be limited to one or more discrete positions within an immersive virtual reality world represented by the virtual reality media content (e.g., representative of merged reality scene 800). As such, provider system 1202 may provide sufficient data within the virtual reality media content representative of merged reality scene 800 to allow merged reality scene 800 to be rendered not only from virtual viewpoints 806, but from any dynamically selectable virtual viewpoint corresponding to an arbitrary virtual location within merged reality scene 800 (e.g. within or around 3D space 802). For example, the dynamically selectable virtual viewpoint may be selected by user 1208 while user 1208 is experiencing merged reality scene 800 using media player device 1206.

As used herein, an "arbitrary virtual location" may refer to any virtual point in space associated with a merged reality scene (e.g., within or around a 3D space of the merged reality scene). For example, arbitrary virtual locations are not limited to fixed positions surrounding the merged reality scene (e.g., fixed positions associated with virtual viewpoints 806), but also include all the positions between the positions associated with virtual viewpoints 806 and positions inside of 3D space 802. Moreover, arbitrary virtual locations may be associated with arbitrary virtual viewpoints not limited to aligning with any of virtual viewpoints 806. In some examples, such arbitrary virtual locations may correspond to the most desirable virtual viewpoints within merged reality scene 800. For instance, if merged reality scene 800 includes a basketball game, user 1208 may dynamically select virtual viewpoints from which to experience the game that are in any arbitrary virtual location on the basketball court. For example, the user may dynamically select his or her virtual viewpoints to follow the basketball up and down the basketball court and experience the basketball game as if standing on the basketball court in the middle of the action of the game. In other words, for example, while virtual viewpoints 806 may be positioned at fixed positions surrounding the basketball court, user 1208 may dynamically select arbitrary virtual viewpoints from which to experience the game that are associated with any arbitrary position on the basketball court.

Network 1204 may include a provider-specific wired or wireless network (e.g., a cable or satellite carrier network or a mobile telephone network), the Internet, a wide area network, a content delivery network, or any other suitable network. Data may flow between provider system 1202 and media player device 1206 (as well as other media player devices not explicitly shown) using any communication technologies, devices, media, and protocols as may serve a particular implementation.

Media player device 1206 may be used by user 1208 to access and experience virtual reality media content received from provider system 1202. For example, media player device 1206 may be configured to generate (e.g., based on the color video data stream and the depth video data stream for each of the virtual viewpoints included within the at least one additional transport stream, which may be 2D video data streams) a 3D representation of 3D space 802 of merged reality scene 800 to be experienced by user 1208 from an arbitrary virtual viewpoint (e.g., a dynamically selectable virtual viewpoint selected by the user and corresponding to an arbitrary virtual location within 3D space 802). To this end, media player device 1206 may include or be implemented by any device capable of presenting a field of view of an immersive virtual reality world (e.g., an immersive virtual reality world representative of merged reality scene 800) and detecting user input from user 1208 to dynamically update the immersive virtual reality world presented within the field of view as user 1208 experiences the immersive virtual reality world.

Figure 13:
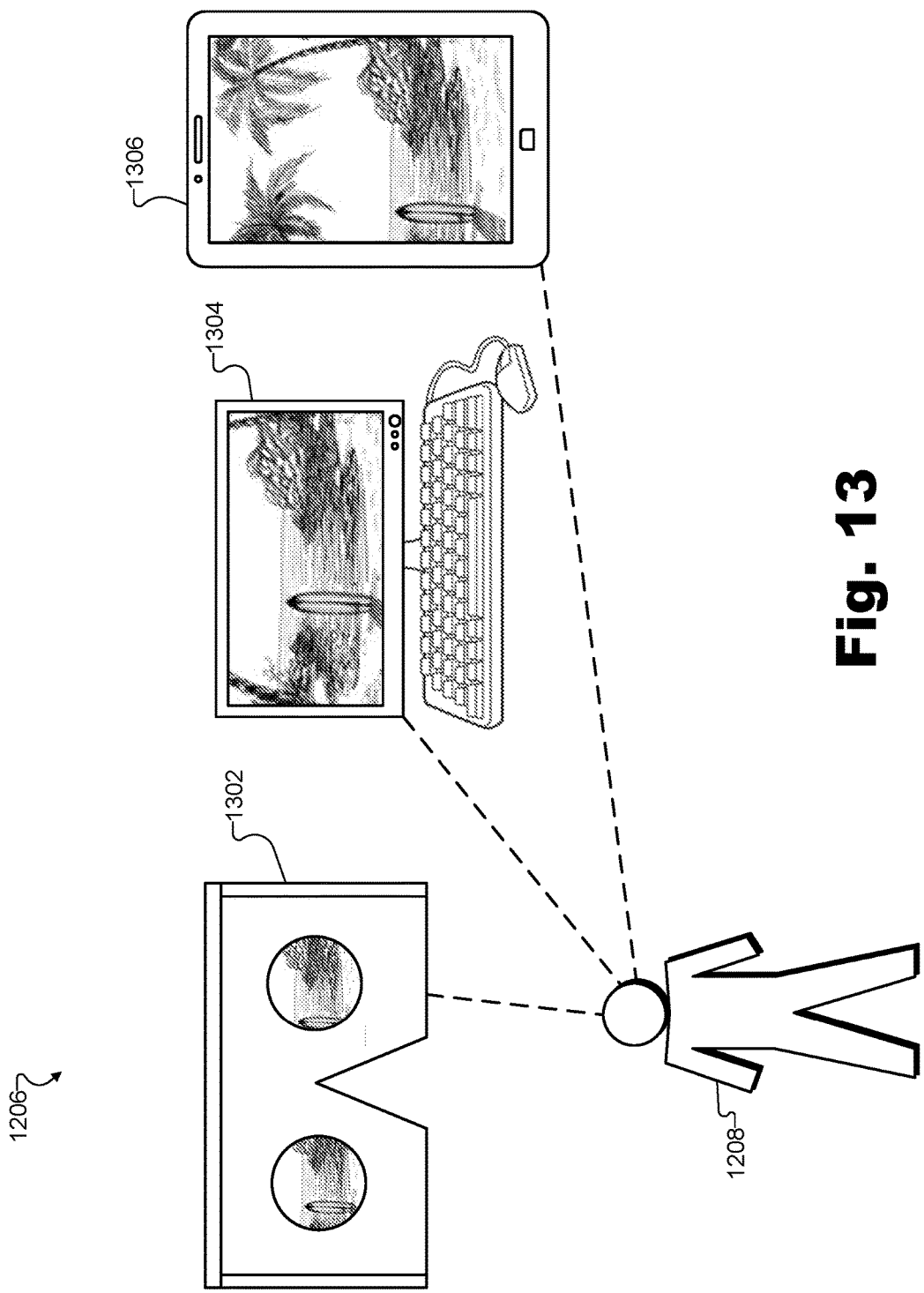
FIG. 13 illustrates various exemplary types of media player devices that may be used by a user to experience virtual reality media content according to principles described herein.

For example, FIG. 13 shows various exemplary types of media player devices 1206 that may be used by user 1208 to experience virtual reality media content. Specifically, as shown, media player device 1206 may take one of several different form factors such as a head-mounted virtual reality device 1302 (e.g., a virtual reality gaming device) that includes a head-mounted display screen, a personal computer device 1304 (e.g., a desktop computer, laptop computer, etc.), a mobile or wireless device 1306 (e.g., a smartphone, a tablet device, etc., possibly mounted to the head of user 1208 by means of a head mount apparatus), or by any other device or configuration of devices that may serve a particular implementation to facilitate receiving and/or presenting virtual reality media content. Different types of media player devices (e.g., head-mounted virtual reality devices, personal computer devices, mobile devices, etc.) may provide different types of virtual reality experiences having different levels of immersiveness for user 1208.

Figure 14:
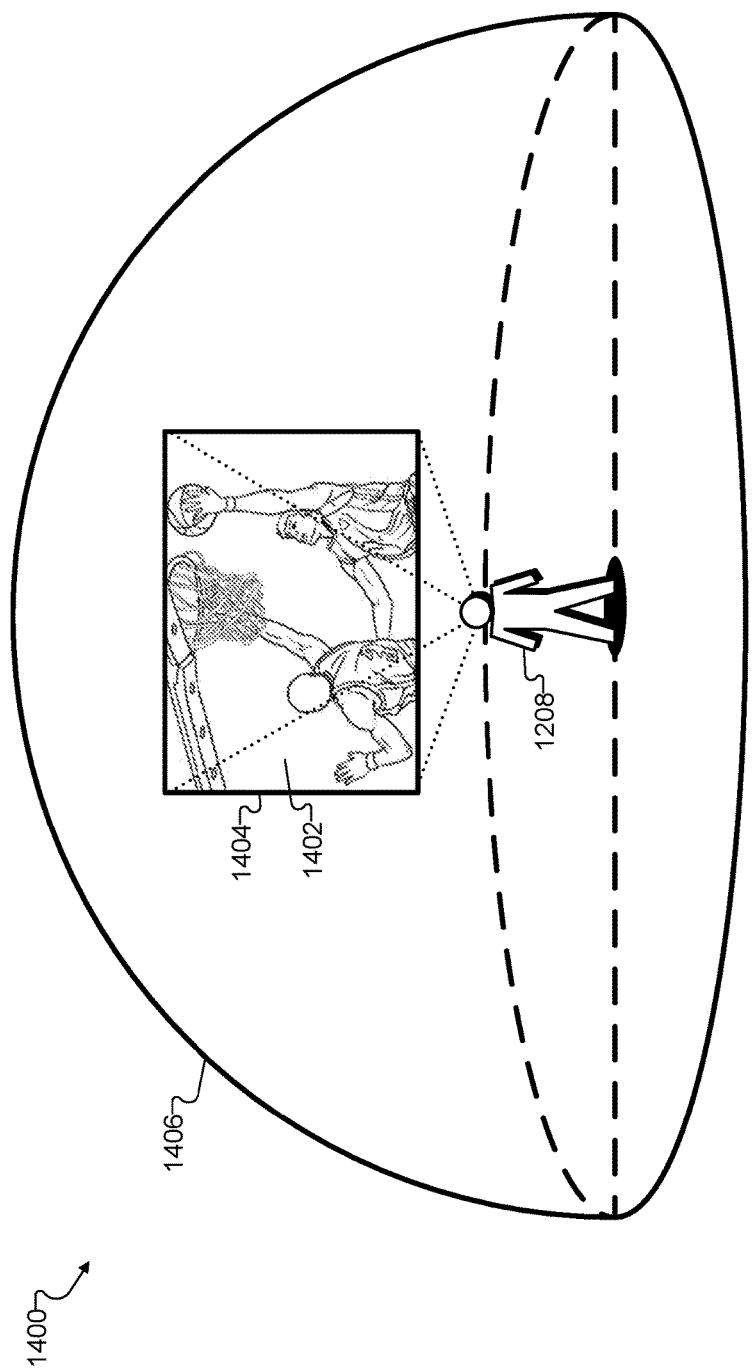
FIG. 14 illustrates an exemplary virtual reality experience in which a user is presented with exemplary virtual reality media content representative of a merged reality scene as experienced from a dynamically selectable virtual viewpoint corresponding to an exemplary arbitrary virtual location with respect to the merged reality scene according to principles described herein.

FIG. 14 illustrates an exemplary virtual reality experience 1400 in which user 1208 is presented with exemplary virtual reality media content representative of a merged reality scene as experienced from a dynamically selectable virtual viewpoint corresponding to an exemplary arbitrary virtual location with respect to the merged reality scene. Specifically, virtual reality media content 1402 is presented within a field of view 1404 that shows a merged reality scene from a virtual viewpoint corresponding to an arbitrary virtual location right underneath a basketball standard within the 3D space of the merged reality scene where a shot is being made. An immersive virtual reality world 1406 based on the merged reality scene may be available for the viewer to experience by providing user input (e.g., head movements, keyboard input, etc.) to look around and/or to move around (i.e., dynamically select a virtual viewpoint from which to experience) immersive virtual reality world 1406.

For example, field of view 1404 may provide a window through which user 1208 may easily and naturally look around immersive virtual reality world 1406. Field of view 1404 may be presented by media player device 1206 (e.g., on a display screen of media player device 1206) and may include video depicting objects surrounding the user within immersive virtual reality world 1406. Additionally, field of view 1404 may dynamically change in response to user input provided by user 1208 as user 1208 experiences immersive virtual reality world 1406. For example, media player device 1206 may detect user input (e.g., moving or turning the display screen upon which field of view 1404 is presented). In response, field of view 1404 may display different objects and/or objects seen from a different virtual viewpoint or virtual location in place of the objects seen from the previous virtual viewpoint or virtual location.

In FIG. 14, immersive virtual reality world 1406 is illustrated as a semi-sphere, indicating that user 1208 may look in any direction within immersive virtual reality world 1406 that is substantially forward, backward, left, right, and/or up from the virtual viewpoint of the location under the basketball standard that user 1208 has currently selected. In other examples, immersive virtual reality world 1406 may include an entire 360° by 180° sphere such that user 1208 may also look down. Additionally, user 1208 may move around to other locations within immersive virtual reality world 1406 (i.e., dynamically selecting different dynamically selectable virtual viewpoints within the 3D space). For example, user 1208 may select a virtual viewpoint at half court, a virtual viewpoint from the free-throw line facing the basketball standard, a virtual viewpoint suspended above the basketball standard, or the like.

Figure 15:
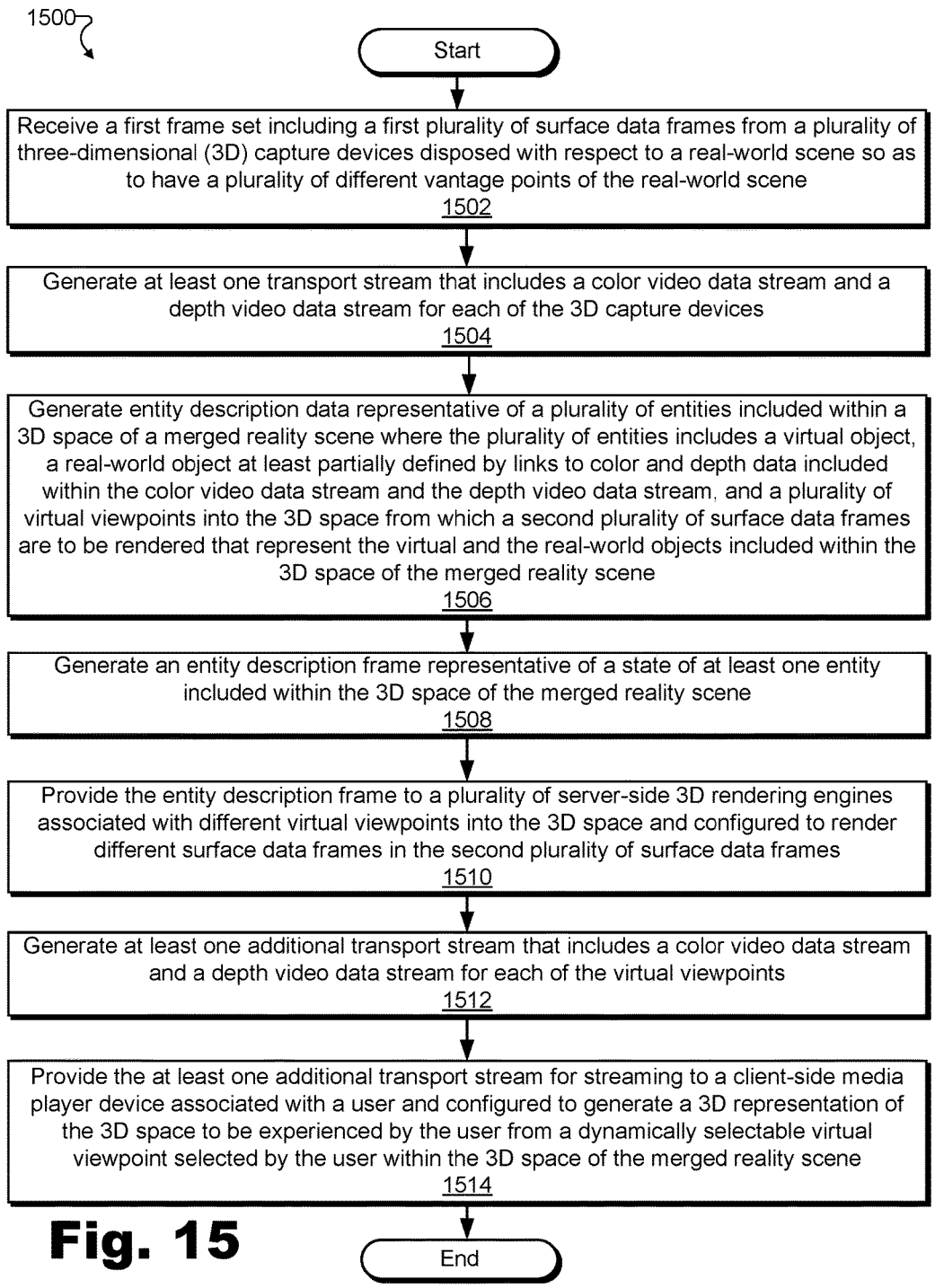
FIG. 15 illustrates an exemplary method for generating a merged reality scene based on a virtual object and on a real-world object represented from different vantage points in different video data streams according to principles described herein.

FIG. 15 illustrates an exemplary method 1500 for generating a merged reality scene based on a virtual object and on a real-world object represented from different vantage points in different video data streams. While FIG. 15 illustrates exemplary operations according to one embodiment, other embodiments may omit, add to, reorder, and/or modify any of the operations shown in FIG. 15. One or more of the operations shown in FIG. 15 may be performed by system 100, an implementation thereof, and/or another system described above as being associated with (e.g., communicatively coupled to, configured to interoperate with, etc.) system 100.

In operation 1502, a merged reality scene capture system may receive a first frame set including a first plurality of surface data frames from a plurality of 3D capture devices disposed with respect to a real-world scene so as to have a plurality of different vantage points of the real-world scene. In some examples, each surface data frame in the first plurality of surface data frames may be captured at a same particular point in time by a respective 3D capture device in the plurality of 3D capture devices. As such, each of these surface data frames may be captured from a respective vantage point in the plurality of different vantage points. The surface data frames in the first plurality of surface data frames may be representative of color data and depth data of surfaces of a real-world object included within the real-world scene as the surfaces appear from the respective vantage point of the respective 3D capture device at the particular point in time. Operation 1502 may be performed in any of the ways described herein.

In operation 1504, the merged reality scene capture system may generate a transport stream that includes a color video data stream and a depth video data stream for each of the 3D capture devices in the plurality of 3D capture devices. In some examples, the transport stream may be generated based on the first frame set received from the plurality of 3D capture devices (e.g., in operation 1502) and/or based on a plurality of other frame sets captured at other points in time. Operation 1504 may be performed in any of the ways described herein.

In operation 1506, the merged reality scene capture system may generate entity description data representative of a plurality of entities included within a 3D space of a merged reality scene. For example, the entity description data may be generated based on the transport stream. Various types of entities may be included within the plurality of entities included within the 3D space of the merged reality scene. For instance, the entities may include a virtual object at least partially defined in the entity description data by links to color data and depth data of surfaces of the virtual object stored within an asset storage system communicatively coupled to the merged reality scene capture system. As another example, the entities may include the real-world object for which data was captured in operation 1502. For instance, the real-world object may be at least partially defined in the entity description data by links to the color data and the depth data of the surfaces of the real-world object included within the color video data stream and the depth video data stream generated based on the first frame set received from the plurality of 3D capture devices and on the plurality of other frame sets (i.e., the video data streams included within the transport stream generated in operation 1504). Moreover, the entities for which entity description data is generated in operation 1506 may include a plurality of virtual viewpoints into the 3D space from which a second frame set including a second plurality of surface data frames are to be rendered. For example, the second plurality of surface data frames may be representative of the color data and the depth data of the surfaces of both the virtual and the real-world objects included within the 3D space of the merged reality scene. Operation 1506 may be performed in any of the ways described herein.

In operation 1508, the merged reality scene capture system may generate an entity description frame representative of a state of at least one entity in the plurality of entities included within the 3D space of the merged reality scene. In some examples, the entity description frame may represent the state of the at least one entity at a particular point in a temporal sequence. Operation 1508 may be performed based on the entity description data representative of the plurality of entities generated in operation 1506. Operation 1508 may be performed in any of the ways described herein.

In operation 1510, the merged reality scene capture system may provide the entity description frame to a plurality of server-side 3D rendering engines associated with a content provider system. For example, each 3D rendering engine in the plurality of server-side 3D rendering engines may be associated with a different virtual viewpoint from the plurality of virtual viewpoints into the 3D space for which the entity description frame data is generated in operation 1506. In some implementations, each of the 3D rendering engines in the plurality of server side 3D rendering engines may be configured to render, a different surface data frame included in the second plurality of surface data frames based on the entity description frame. Operation 1510 may be performed in any of the ways described herein.

In operation 1512, a video data packaging system communicatively coupled to the plurality of server-side 3D rendering engines and/or otherwise associated with the merged reality scene capture system may generate at least one additional transport stream. For example, the video data packaging system may generate the at least one additional transport stream based on the second frame set including the second plurality of surface data frames and/or based on additional frame sets including respective additional pluralities of surface data frames. In some examples, the at least one additional transport stream may include a color video data stream and a depth video data stream for each of the virtual viewpoints in the plurality of virtual viewpoints for which entity description data is generated in operation 1506. Operation 1512 may be performed in any of the ways described herein.

In operation 1514, the video data packaging system associated with the merged reality scene capture system may provide the at least one additional transport stream for streaming to a client-side media player device associated with a user. For instance, the client-side media player device may be configured to generate, based on the color video data stream and the depth video data stream for each of the virtual viewpoints included within the at least one additional transport stream, a 3D representation of the 3D space of the merged reality scene to be experienced by the user. In some examples, the 3D representation of the 3D space may be experienced by the user from a dynamically selectable virtual viewpoint selected by the user and corresponding to an arbitrary virtual location within the 3D space of the merged reality scene. Operation 1514 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 16:
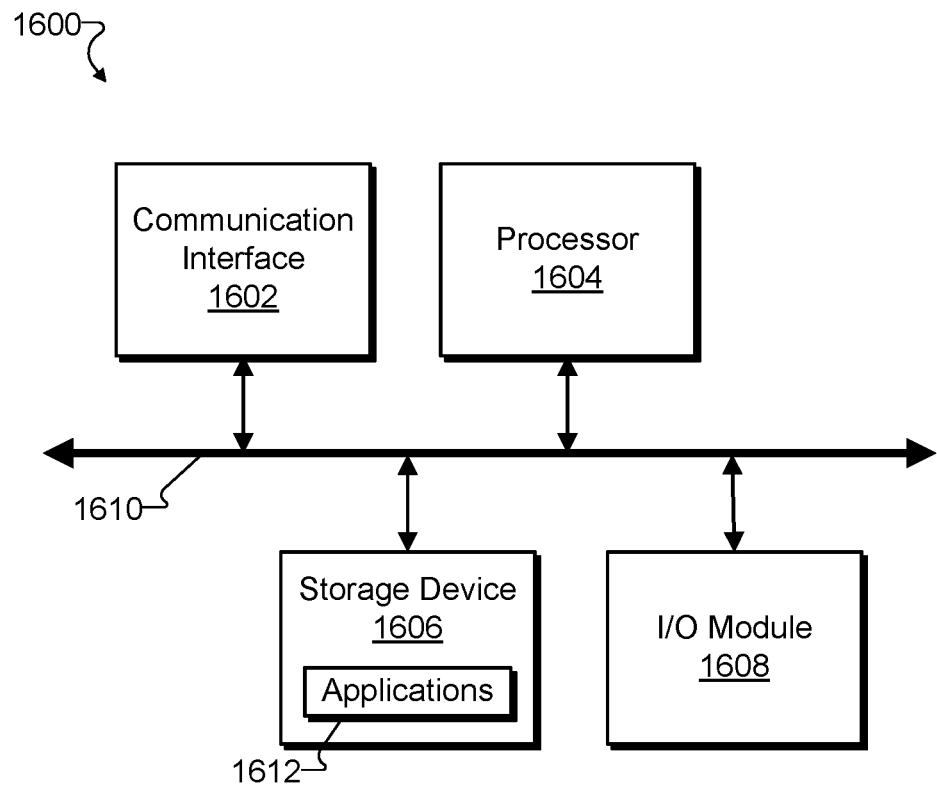
FIG. 16 illustrates an exemplary computing device according to principles described herein.

FIG. 16 illustrates an exemplary computing device 1600 that may be specifically configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a modem, an audio/video connection, and any other suitable interface.

Processor 1604 generally represents any type or form of processing unit (e.g., a central processing unit and/or a graphics processing unit) capable of processing data or interpreting, executing, and/or directing execution of one or more of the instructions, processes, and/or operations described herein. Processor 1604 may direct execution of operations in accordance with one or more applications 1612 or other computer-executable instructions such as may be stored in storage device 1606 or another computer-readable medium.

Storage device 1606 may include one or more data storage media, devices, or configurations and may employ any type, form, and combination of data storage media and/or device. For example, storage device 1606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1606. For example, data representative of one or more executable applications 1612 configured to direct processor 1604 to perform any of the operations described herein may be stored within storage device 1606. In some examples, data may be arranged in one or more databases residing within storage device 1606.

I/O module 1608 may include one or more I/O modules configured to receive user input and provide user output. One or more I/O modules may be used to receive input for a single virtual reality experience. I/O module 1608 may include any hardware, firmware, software, or combination thereof supportive of input and output capabilities. For example, I/O module 1608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1600. For example, one or more applications 1612 residing within storage device 1606 may be configured to direct processor 1604 to perform one or more operations or functions associated with real-world scene capture facility 102 or merged reality entity state tracking facility 104 of system 100 (see FIG. 1). Likewise, storage facility 106 of system 100 may be implemented by or within storage device 1606.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a merged reality scene capture system from a plurality of three-dimensional (3D) capture devices disposed with respect to a real-world scene so as to have a plurality of different vantage points of the real-world scene, a first frame set including a first plurality of surface data frames each
      captured at a same particular point in time by a respective 3D capture device in the plurality of 3D capture devices and from a respective vantage point in the plurality of different vantage points, and
      representative of color data and depth data of surfaces of a real-world object included within the real-world scene as the surfaces appear from the respective vantage point of the respective 3D capture device at the particular point in time;
   generating, by the merged reality scene capture system based on the first frame set received from the plurality of 3D capture devices and on a plurality of other frame sets captured at other points in time, a transport stream that includes a color video data stream and a depth video data stream for each of the 3D capture devices in the plurality of 3D capture devices; and
   generating, by the merged reality scene capture system based on the transport stream, entity description data representative of a plurality of entities included within a 3D space of a merged reality scene, the plurality of entities including
      a virtual object at least partially defined in the entity description data by links to color data and depth data of surfaces of the virtual object, the color data and depth data of the surfaces of the virtual object stored within an asset storage system communicatively coupled to the merged reality scene capture system,
      the real-world object at least partially defined in the entity description data by links to the color data and the depth data of the surfaces of the real-world object included within the color video data stream and the depth video data stream generated based on the first frame set received from the plurality of 3D capture devices and on the plurality of other frame sets, and
      a plurality of virtual viewpoints into the 3D space from which a second frame set including a second plurality of surface data frames are to be rendered, the second plurality of surface data frames representative of the color data and the depth data of the surfaces of both the virtual and the real-world objects included within the 3D space of the merged reality scene.

2. The method of claim 1, further comprising:
   generating, by the merged reality scene capture system based on the entity description data representative of the plurality of entities, an entity description frame representative of a state of an entity in the plurality of entities included within the 3D space of the merged reality scene at a particular point in a temporal sequence; and providing, by the merged reality scene capture system, the entity description frame to a plurality of 3D rendering engines associated with a content provider system, each 3D rendering engine in the plurality of 3D rendering engines associated with a different virtual viewpoint from the plurality of virtual viewpoints into the 3D space and configured to render, based on the entity description frame, a different surface data frame included in the second plurality of surface data frames.

3. The method of claim 2, further comprising:

generating, by a video data packaging system communicatively coupled to the plurality of 3D rendering engines and based on the second frame set including the second plurality of surface data frames and on additional frame sets including respective additional pluralities of surface data frames, another transport stream that includes a color video data stream and a depth video data stream for each of the virtual viewpoints in the plurality of virtual viewpoints, and providing, by the video data packaging system, the other transport stream for streaming to a client-side media player device associated with a user, the client-side media player device configured to generate, based on the color video data stream and the depth video data stream for each of the virtual viewpoints included within the other transport stream, a 3D representation of the 3D space of the merged reality scene to be experienced by the user from a dynamically selectable virtual viewpoint selected by the user and corresponding to an arbitrary virtual location within the 3D space of the merged reality scene.

4. The method of claim 1, wherein the generating of the entity description data representative of the real-world object includes:

generating, based on the color video data stream and the depth video data stream generated based on the first frame set and on the plurality of other frame sets, a 3D representation of the real-world object included within the real-world scene; and generating the links to the color data and the depth data of the surfaces of the real-world object that at least partially define the real-world object in the entity description data as pointers to the 3D representation of the real-world object.

5. The method of claim 1, further comprising:

receiving, by the merged reality scene capture system from a scene control system, a command to modify the entity description data representative of the plurality of entities; and modifying, by the merged reality scene capture system in response to the receiving of the command, the entity description data representative of the plurality of entities in accordance with the command.

6. The method of claim 1, wherein the generating of the entity description data representative of the plurality of entities includes creating a virtual interaction between the virtual object included within the 3D space of the merged reality scene and the real-world object included within the 3D space of the merged reality scene, the virtual interaction based on at least one of a physics-based object behavior and an artificial intelligence-based (AI-based) object behavior.

7. The method of claim 1, further comprising:

receiving, by the merged reality scene capture system, metadata associated with the first frame set, the metadata differentiating the color data and the depth data of the surfaces of the real-world object from other color data and other depth data representative of other surfaces of an additional real-world object included within the real-world scene at the particular point in time;

wherein the plurality of entities included within the 3D space of the merged reality scene for which the entity description data is generated further includes the additional real-world object, the additional real-world object is at least partially defined in the entity description data by links to the other color data and the other depth data representative of the other surfaces of the additional real-world object included within the color video data stream and the depth video data stream, and the links to the color data and the depth data of the surfaces of the real-world object and the links to the other color data and the other depth data representative of the other surfaces of the additional real-world object are based on the metadata differentiating the color data and the depth data of the surfaces of the real-world object from the other color data and the other depth data representative of the other surfaces of the additional real-world object.

8. The method of claim 1, wherein a first spatial configuration of the plurality of the different vantage points of the real-world scene is independent from a second spatial configuration of the plurality of the virtual viewpoints into the 3D space of the merged reality scene.

9. The method of claim 1, wherein the receiving of the first frame set, the generating of the transport stream, and the generating of the entity description data are each performed by the merged reality scene capture system in real time as events occur within the real-world scene.

10. The method of claim 1, embodied as computer-executable instructions on at least one non-transitory computer-readable medium.

11. A merged reality scene capture system comprising:

a plurality of three-dimensional (3D) capture devices disposed with respect to a real-world scene so as to have a plurality of different vantage points of the real-world scene by which to capture data representative of a real-world object included within the real-world scene;

an asset storage system storing color data and depth data representative of surfaces of a virtual object;

a plurality of server-side 3D rendering engines communicatively coupled to the asset storage system; and an entity state tracking system communicatively coupled to the plurality of 3D capture devices, the asset storage system, and the plurality of server-side 3D rendering engines, the entity state tracking system configured to, in real time as events occur within the real-world scene, receive, from the plurality of 3D capture devices, a first frame set including a first plurality of surface data frames, the first plurality of surface data frames representative of surfaces of the real-world object, generate, based on the first frame set and on a plurality of other frame sets received from the plurality of 3D capture devices, a transport stream that includes a color video data stream and a depth video data stream for each of the 3D capture devices in the plurality of 3D capture devices, generate, based on the transport stream and on the color data and depth data stored in the asset storage system, entity description data representative of a plurality of entities included within a 3D space of a merged reality scene, the plurality of entities including
  the virtual object represented by the color data and the depth data stored in the asset storage system,
  the real-world object represented by the first plurality of surface data frames representative of the surfaces of the real-world object and included within the first frame set, and
  a plurality of virtual viewpoints into the 3D space of the merged reality scene,
generate, based on the entity description data representative of the plurality of entities, an entity description frame representative of a state of an entity in the plurality of entities included within the 3D space of the merged reality space at a particular point in a temporal sequence, and
provide the entity description frame to the plurality of server-side 3D rendering engines, wherein each 3D rendering engine in the plurality of server-side 3D rendering engines is associated with a different virtual viewpoint from the plurality of virtual viewpoints into the 3D space and is configured to render, based on the entity description frame, a different surface data frame included within a second plurality of surface data frames of a second frame set and representative of a view of the 3D space of the merged reality scene visible from the different virtual viewpoint at the particular point in the temporal sequence.

12. A merged reality scene capture system comprising:
at least one physical computing device that
  receives, from a plurality of three-dimensional (3D) capture devices disposed with respect to a real-world scene so as to have a plurality of different vantage points of the real-world scene, a first frame set including a first plurality of surface data frames each captured at a same particular point in time by a respective 3D capture device in the plurality of 3D capture devices and from a respective vantage point in the plurality of different vantage points, and
  representative of color data and depth data of surfaces of a real-world object included within the real-world scene as the surfaces appear from the respective vantage point of the respective 3D capture device at the particular point in time;
  generates, based on the first frame set received from the plurality of 3D capture devices and on a plurality of other frame sets captured at other points in time, a transport stream that includes a color video data stream and a depth video data stream for each of the 3D capture devices in the plurality of 3D capture devices; and
  generates, based on the transport stream, entity description data representative of a plurality of entities included within a 3D space of a merged reality scene, the plurality of entities including
    a virtual object at least partially defined in the entity description data by links to color data and depth data of surfaces of the virtual object, the color data and depth data of the surfaces of the virtual object stored within an asset storage system communicatively coupled to the merged reality scene capture system,
    the real-world object at least partially defined in the entity description data by links to the color data and the depth data of the surfaces of the real-world object included within the color video data stream and the depth video data stream generated based on the first frame set received from the plurality of 3D capture devices and on the plurality of other frame sets, and
    a plurality of virtual viewpoints into the 3D space from which a second frame set including a second plurality of surface data frames are to be rendered, the second plurality of surface data frames representative of the color data and the depth data of the surfaces of both the virtual and the real-world objects included within the 3D space of the merged reality scene.

13. The merged reality scene capture system of claim 12, wherein the at least one physical computing device further:
  generates, based on the entity description data representative of the plurality of entities, an entity description frame representative of a state of an entity in the plurality of entities included within the 3D space of the merged reality space at a particular point in a temporal sequence; and
  provides the entity description frame to a plurality of 3D rendering engines associated with a content provider system, each 3D rendering engine in the plurality of 3D rendering engines associated with a different virtual viewpoint from the plurality of virtual viewpoints into the 3D space and configured to render, based on the entity description frame, a different surface data frame included in the second plurality of surface data frames.

14. The merged reality scene capture system of claim 13, wherein the plurality of 3D rendering engines is communicatively coupled to a video data packaging system that:
  generates, based on the second frame set including the second plurality of surface data frames and on additional frame sets including respective additional pluralities of surface data frames, another transport stream that includes a color video data stream and a depth video data stream for each of the virtual viewpoints in the plurality of virtual viewpoints, and
  provides the other transport stream for streaming to a client-side media player device associated with a user, the client-side media player device configured to generate, based on the color video data stream and the depth video data stream for each of the virtual viewpoints included within the other transport stream, a 3D representation of the 3D space of the merged reality scene to be experienced by the user from a dynamically selectable virtual viewpoint selected by the user and corresponding to an arbitrary virtual location within the 3D space of the merged reality scene.

15. The merged reality scene capture system of claim 12, wherein the at least one physical computing device generates the entity description data representative of the real-world object by:
  generating, based on the color video data stream and the depth video data stream generated based on the first frame set and on the plurality of other frame sets, a 3D representation of the real-world object included within the real-world scene; and
  generating the links to the color data and the depth data of the surfaces of the real-world object that at least partially define the real-world object in the entity description data as pointers to the 3D representation of the real-world object.

16. The merged reality scene capture system of claim 12, wherein the at least one physical computing device further:

receives, from a scene control system, a command to modify the entity description data representative of the plurality of entities; and modifies, in response to the receiving of the command, the entity description data representative of the plurality of entities in accordance with the command.

17. The merged reality scene capture system of claim 12, wherein the at least one physical computing device generates the entity description data representative of the plurality of entities by creating a virtual interaction between the virtual object included within the 3D space of the merged reality scene and the real-world object included within the 3D space of the merged reality scene, the virtual interaction based on at least one of a physics-based object behavior and an artificial intelligence-based (AI-based) object behavior.

18. The merged reality scene capture system of claim 12, wherein the at least one physical computing device further:

receives metadata associated with the first frame set, the metadata differentiating the color data and the depth data of the surfaces of the real-world object from other color data and other depth data representative of other surfaces of an additional real-world object included within the real-world scene at the particular point in time;

wherein
the plurality of entities included within the 3D space of the merged reality scene for which the entity description data is generated further includes the additional real-world object,
the additional real-world object is at least partially defined in the entity description data by links to the other color data and the other depth data representative of the other surfaces of the additional real-world object included within the color video data stream and the depth video data stream, and
the links to the color data and the depth data of the surfaces of the real-world object and the links to the other color data and the other depth data representative of the other surfaces of the additional real-world object are based on the metadata differentiating the color data and the depth data of the surfaces of the real-world object from the other color data and the other depth data representative of the other surfaces of the additional real-world object.

19. The merged reality scene capture system of claim 12, wherein a first spatial configuration of the plurality of the different vantage points of the real-world scene is independent from a second spatial configuration of the plurality of the virtual viewpoints into the 3D space of the merged reality scene.

20. The merged reality scene capture system of claim 12, wherein the at least one physical computing device receives the first frame set, generates the transport stream, and generates the entity description data in real time as events occur within the real-world scene.

* * * * *